US008698841B2

(12) United States Patent
Olsen

(10) Patent No.: US 8,698,841 B2
(45) Date of Patent: Apr. 15, 2014

(54) SYSTEM, METHOD AND PROCESS OF IDENTIFYING AND ADVERTISING ORGANIZATIONS OR OTHER ENTITIES BY OVERLAYING IMAGE FILES ON CARTOGRAPHIC MAPPING APPLICATIONS

(75) Inventor: M. Brandon Olsen, Midvale, UT (US)

(73) Assignee: GeoReplica, Inc., Murray, UT (US)

( * ) Notice: Subject to any disclaimer, the term of this patent is extended or adjusted under 35 U.S.C. 154(b) by 731 days.

(21) Appl. No.: 12/834,870

(22) Filed: Jul. 12, 2010

(65) Prior Publication Data

US 2011/0267369 A1 Nov. 3, 2011

Related U.S. Application Data

(60) Provisional application No. 61/224,819, filed on Jul. 10, 2009.

(51) Int. Cl.
*G09G 5/00* (2006.01)
*G09G 5/14* (2006.01)
*G06T 11/00* (2006.01)
*G06T 11/60* (2006.01)
*G06T 19/00* (2011.01)
*G06T 17/20* (2006.01)
*G06T 15/40* (2011.01)

(52) U.S. Cl.
CPC *G09G 5/14* (2013.01); *G06T 11/00* (2013.01); *G06T 11/60* (2013.01); *G06T 19/00* (2013.01); *G06T 17/20* (2013.01); *G06T 15/40* (2013.01)
USPC ............ 345/629; 345/634; 345/641; 345/419

(58) Field of Classification Search
CPC .......... G09G 5/14; G06T 11/00; G06T 11/60; G06T 19/00; G06T 17/20; G06T 15/40
USPC ......................................... 345/418–427, 629
See application file for complete search history.

(56) References Cited

U.S. PATENT DOCUMENTS 6,493,630 B2 12/2002 Ruiz et al.
6,542,814 B2 4/2003 Polidi et al.

(Continued)

FOREIGN PATENT DOCUMENTS

| JP | 2005077929 | 3/2005 |
| JP | 2007212857 | 8/2007 |
| JP | 2007256746 | 10/2007 |

OTHER PUBLICATIONS

International Searching Authority, International Search Report and the Written Opinion of the International Searching Authority, or the Declaration, Oct. 14, 2010, PCT/US2010/41755.

*Primary Examiner* — Jin-Cheng Wang
(74) *Attorney, Agent, or Firm* — Terrence J. Edwards; TechLaw Ventures, PLLC

(57) ABSTRACT

A system, method and process of identifying and advertising organizations or other entities by overlaying image files on cartographic mapping applications is disclosed. Applicant has discovered a system, method and process for displaying image files of logos, trademarks or other source identifying objects, such as a trade name or the like, that are used to identify or advertise a business or other establishment using various cartographic mapping applications, such as Internet or online mapping applications, geobrowser applications, geospatial software applications, GPS mapping applications, such as navigation systems, or other mapping products, such as MapQuest®, Google® Maps, Yahoo!® Maps, and other mapping applications.

46 Claims, 17 Drawing Sheets

(56) References Cited

U.S. PATENT DOCUMENTS

| | | |
|---|---|---|
| 7,359,797 B2 | 4/2008 | Dorfman et al. |
| 7,466,244 B2 | 12/2008 | Kimchi et al. |
| 7,587,276 B2 | 9/2009 | Gold et al. |
| 2006/0287815 A1 | 12/2006 | Gluck |
| 2007/0210937 A1 | 9/2007 | Smith et al. |
| 2007/0255493 A1 | 11/2007 | Ayoub et al. |
| 2007/0257792 A1 | 11/2007 | Gold |
| 2007/0271035 A1 | 11/2007 | Stoschek et al. |
| 2007/0273558 A1 | 11/2007 | Smith et al. |
| 2008/0104531 A1 | 5/2008 | Stambaugh |
| 2008/0172244 A1 | 7/2008 | Coupal et al. |
| 2008/0249702 A1 | 10/2008 | Ofek et al. |
| 2008/0262714 A1 | 10/2008 | Ettinger |
| 2008/0262717 A1 | 10/2008 | Ettinger |
| 2009/0055093 A1 | 2/2009 | Hamilton, II et al. |
| 2009/0063040 A1 | 3/2009 | Schliermann |
| 2009/0073191 A1* | 3/2009 | Smith et al. .................. 345/629 |
| 2009/0263026 A1 | 10/2009 | Verne et al. |
| 2010/0118025 A1* | 5/2010 | Smith et al. .................. 345/418 |

* cited by examiner

SYSTEM, METHOD AND PROCESS OF IDENTIFYING AND ADVERTISING ORGANIZATIONS OR OTHER ENTITIES BY OVERLAYING IMAGE FILES ON CARTOGRAPHIC MAPPING APPLICATIONS

CROSS-REFERENCE TO RELATED APPLICATIONS

This application claims the benefit of U.S. Provisional Patent Application No. 61/224,819, filed Jul. 10, 2009, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH OR DEVELOPMENT

Not Applicable.

BACKGROUND

The disclosure relates generally to cartographic mapping applications, whether internet-based or interactive mapping applications, GPS-based cartographic mapping applications or other cartographic mapping applications, and more particularly, but not necessarily entirely, to a system, method and process of identifying and advertising businesses and other establishments by overlaying image files on such cartographic mapping applications.

There are various computing platforms that graphically display maps of geographic areas. For example, some in-vehicle navigation systems include a display screen upon which a map of a geographic area can be displayed graphically. In addition, by using appropriate software applications, cartographic maps can also be displayed on mobile devices and general purpose computing platforms, such as personal computers, telephones, and personal digital assistants.

Some computing platforms and applications that display cartographic maps graphically include features allowing a user to interact with the map. Various types of user interaction may be supported. Among the features that may be supported are the ability to zoom in or out of the map, the ability to show the flow of traffic, the ability to show a graphical map, the ability to show a satellite image (aerial imagery) of a geographic area or a combination of a graphical map overlaid on a satellite image, and the ability to show the terrain of a geographical area. Recently, cartographic mapping applications have added the ability to view images as if a person is viewing a specific area from the middle of the street, also known as "street view" in one mapping application, as well as other interactive features, such as high-resolution photos, points of interest, trails and other recreational features, etc. to increase or enhance the ability of a user to view and identify a location without physically visiting that location. Further, cartographic mapping applications have become increasingly useful by adding interactive features such as the ability for a user to show the locations of various categories of consumer-related establishments, such as restaurants, parking garages, movie theaters, hotels, shopping malls, gas stations, coffee shops, pharmacies, grocery stores, and the like. Each category may be represented by a generic category icon or image to let the user know what type of establishment is located in a given area, but the generic category icon or image does not provide any details about the name of the establishment.

Maps shown at different scales on display screens may include different levels of detail. This is done in order to make it easier for a user to read and understand the information presented on the map. The level of detail of the various establishments changes according to the scale of the map. For example, large-scale maps may include more detail (e.g., all the streets and other cartographic features may be displayed), whereas small-scale maps may include less detail (e.g., secondary streets and minor features may be omitted). Despite the scale, the detail relating to the various features available on different mapping applications also changes accordingly.

For example, a user visiting a metropolitan area for the first time or another area with which the user is unfamiliar may enter a specific address into a cartographic mapping application and find various establishments, such as movie theaters and restaurants, nearby on a street-level scale (large scale). To identify the name of a particular restaurant, the user must click on the generic category icon or image that represents a restaurant in that location. A pop-up bubble may then provide information about that establishment, such as the name, address, and telephone number, for the user's reference. These interactive features allow a user to quickly navigate a given area and immediately become familiar with that area such that the user will recognize a specific location prior to personally visiting that location.

There are several cartographic mapping applications that are commonly used by the general public. Such mapping applications include MapQuest®, Google® Maps, Yahoo!® Maps, Microsoft® Virtual Earth®, and other mapping applications. Despite the advantages of known cartographic mapping applications, improvements are still being sought. To enhance both the user's experience using a cartographic mapping application as well as an establishment's exposure and familiarity to a user, the disclosure provides a system, method, and process of identifying and advertising businesses and other establishments by overlaying image files on such mapping applications.

To any regular users of current cartographic systems, it is common to discover that a lack of precision exists and causes inconvenience on many levels. Often a GPS system, as available in everything from automobiles to cell phones, can get a user to a location only to find that the location is off by a considerable distance or that the desired destination is not recognizable among the surrounding structures. Additionally, many destinations are nested within larger structures such as office buildings and malls, such that a plurality ingress and egress options are available and may be confusing as to which would get you closer to the desired destination. The current iterations of mapping devices do not provide the level of precision for optimal convenience, nor do they take in to account important details. There is a long felt, but currently unmet, need for a system, method, and process providing greater precision and detail such that a particular business or establishment immediately stands out on a map along with additional information to easily and quickly enable a user to find a particular destination relating to a business, product, or service provider.

The cartographic mapping applications known may be characterized by several disadvantages that may be addressed by the disclosure. The disclosure minimizes, and in some aspects eliminates, the failures and other problems by utilizing the systems, methods, processes, and associated features described herein.

The features and advantages of the disclosure will be set forth in the description that follows, and in part will be apparent from the description or may be learned by the practice of the disclosure without undue experimentation. The features and advantages of the disclosure may be realized and obtained by means of the instruments and combinations particularly pointed out herein.

SUMMARY

An embodiment of the disclosure for a system for providing a logo layer overlay on a map may comprise the following: a logo database having logo data representing logo images; a map database having map data representing a geographical area; an entity location database having entity location data representing entity locations; an entity footprint database having entity footprint data representing an area that an entity occupies from a top down perspective; a bounding component that identifies the dimensions of the logo image and identifies the dimensions of the entity footprint and sizes the logo image so as to fit within the dimensions of the entity footprint; a location component that identifies an entity location corresponding to map data within said map database; a rendering component that renders an output to a user. The output may comprise: a map layer corresponding to an entity location; and a logo layer corresponding to an entity footprint. The entity footprint may be rendered approximate said entity location and the logo layer may be rendered corresponding to said entity footprint. In the system, the logo layer may be the top most layer rendered; and the logo layer may be bounded by the dimensions of said footprint.

In an embodiment an entity might be a building, plat, parcel, or any other real world object wherein an occupant resides or does business there from. Accordingly the footprint of an entity will be the footprint of a building in some embodiments. An entity may also be a plat, a parcel, or any other real world object defining a location and/or an area.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location; and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a scaling component that identifies the scale of the map data and applies a scaling factor to scale the dimensions of the building footprint and also scales the logo so as to fit within the scaled dimensions of the building footprint.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location; and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an information component that identifies additional information data corresponding to the logo and causes additional information to be rendered.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an information component that identifies additional information data corresponding to the logo and causes additional information to be rendered. The additional information may be data, such as advertising or other data that may be useful to a user.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an information component that identifies additional information to be rendered corresponding to the logo and location.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. In this embodiment, the map database may be provided by a third party.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The bounding component may further comprise a parcel polygon set of instructions that ascertains a polygon that defines a viewable surface of the building.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The bounding component may further comprise an edge detection set of instructions that determines an outside perimeter of a building footprint selected from said building footprint database.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a building information database having detailed building information about a business of an occupant of a corresponding building and wherein detailed information is rendered in a layer to be output.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a building information database having detailed building information about a business of an occupant of a corresponding building and wherein detailed information is rendered in a layer to be output. The information data may include one or more advertisements related to the business of the corresponding building. The advertisements may be rendered in a layer to be output.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The rendering component may selectively alter the orientation of the logo corresponding to the orientation of the rendered map layer so as to make said logo readable to a user.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a building entrance database having building entrance data representing the location of the entrances for a building and wherein the entrances of the building may be rendered in a layer to be output.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a multi-tenant building database having detailed tenant building information for a plurality of tenants in a single building.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a multi-tenant building database having detailed tenant building information for a plurality of tenants in a single building. The system may further comprise the relative location of tenants within a multi-tenant building, which may be rendered in a layer to be output.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a logo priority component comprising instructions for determining a rendering hierarchy when rendering area is limited.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a bounding override component comprising instructions for determining the displayed dimensions of a logo when said building footprint dimensions is scaled too small for supporting a readable logo rendering.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a plat database having plat data and wherein a plat correlation component comprises instructions to determine the displayed dimensions of a logo to be rendered based on plat data.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a building information database having detailed building information about a business of an occupant of a corresponding building and wherein detailed information is rendered in a layer to be output. The system may further comprise a user interface wherein detailed information can be changed by a user or administrator in real time.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise a security component comprising instructions for preventing unauthorized use of the system.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an Internet based user interface for entering data into the system.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an account database having account data therein.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an approval component comprising instructions for preventing data entered by a user from being used in the system until it is approved, and wherein said approval component allows data entered by a user to be used after said data has been approved.

An embodiment of the disclosure for a system for providing a logo layer overlay on a map may comprise the following: a logo database having logo data representing logo images; a map database having map data representing a geographical area; a building location database having building location data representing building locations; a building footprint database having building footprint data representing an area that a building occupies from a top down perspective; a bounding component that identifies the dimensions of the logo image and identifies the dimensions of the building footprint and sizes the logo image so as to fit within the dimensions of the building footprint; a location component that identifies a building location corresponding to map data within said map database; a rendering component that renders an output to a user. The output may comprise: a map layer corresponding to a building location and a logo layer corresponding to a building footprint. The building footprint may be rendered approximate said building location and the logo layer may be rendered corresponding to said building footprint. In the system, the logo layer may be the top most layer rendered; and the logo layer may be bounded by the dimensions of said footprint. The system may further comprise an approval component comprising instructions for preventing data entered by a user from being used in the system until it is approved, and wherein said approval component allows data entered by a user to be used after said data has been approved. The approval may be based on verification of location data.

An embodiment of a method of overlaying a logo layer in a map may comprise the following: collecting a logo database having logo data representing logo images; collecting a map database having map data representing a geographical area; collecting a building location database having building location data representing building locations; collecting a building footprint database having building footprint data representing an area a building occupies from a top down perspective; identifying the dimensions of the logo image; identifying the dimensions of the building footprint; sizing the logo image so as to fit within the dimensions of the building footprint; identifying a building location corresponding to map data within said map database; and rendering an output to a user. The output may comprise: a map layer corresponding to a building location and a logo layer corresponding to a building footprint. The method may further include rendering said building footprint approximate to said building location; rendering said logo layer so as to correspond to said building footprint; overlaying said logo layer as the top most layer on to said map layer; and bounding logos within said logo layer according to dimensions of said footprint.

A further embodiment of the method may comprise identifying the scale of the map data and applying a scaling factor to scale the dimensions of the building footprint; and scaling the logo so as to fit within the scaled dimensions of building footprint.

A further embodiment of the method may comprise identifying additional information data corresponding to the logo; and rendering said additional information.

In a further embodiment of the method, the additional information may be data, such as advertising or other data that may be useful to a user.

A further embodiment of the method may comprise identifying additional information to be rendered corresponding to the logo and location.

A further embodiment of the method may comprise receiving map database from a third party source.

A further embodiment of the method may comprise supplying said rendered logo layer to a third party for inclusion with the third party's rendered layers.

A further embodiment of the method may comprise ascertaining a polygon as a boundary defining a building footprint.

A further embodiment of the method may comprise detecting the edge of a building footprint and generating a footprint data set.

A further embodiment of the method may comprise rendering building information about a business of an occupant of a corresponding building in a layer to be output.

In a further embodiment of the method, the information data may include one or more advertisements related to the business of the corresponding building.

A further embodiment of the method may comprise selectively altering the orientation of the logo to correspond to the orientation of the rendered map layer so as to make said logo readable to a user.

A further embodiment of the method may comprise rendering the location of building entrances in a layer.

A further embodiment of the method may comprise placing a logo on a multi-tenant building footprint corresponding to the relative location of tenants within a multi-tenant building.

A further embodiment of the method may comprise determining a rendering hierarchy when rendering area is limited.

A further embodiment of the method may comprise not scaling the dimensions of a logo when said building footprint dimensions is scaled too small for supporting a readable logo rendering.

A further embodiment of the method may comprise using plat data to determine the displayed dimensions of a logo to be rendered.

A further embodiment of the method may comprise updating said detailed information in real time.

A further embodiment of the method may comprise preventing unauthorized access by providing security means.

The above-discussed embodiments may be implemented by a webpage or other user interface without departing from the scope of the disclosure.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
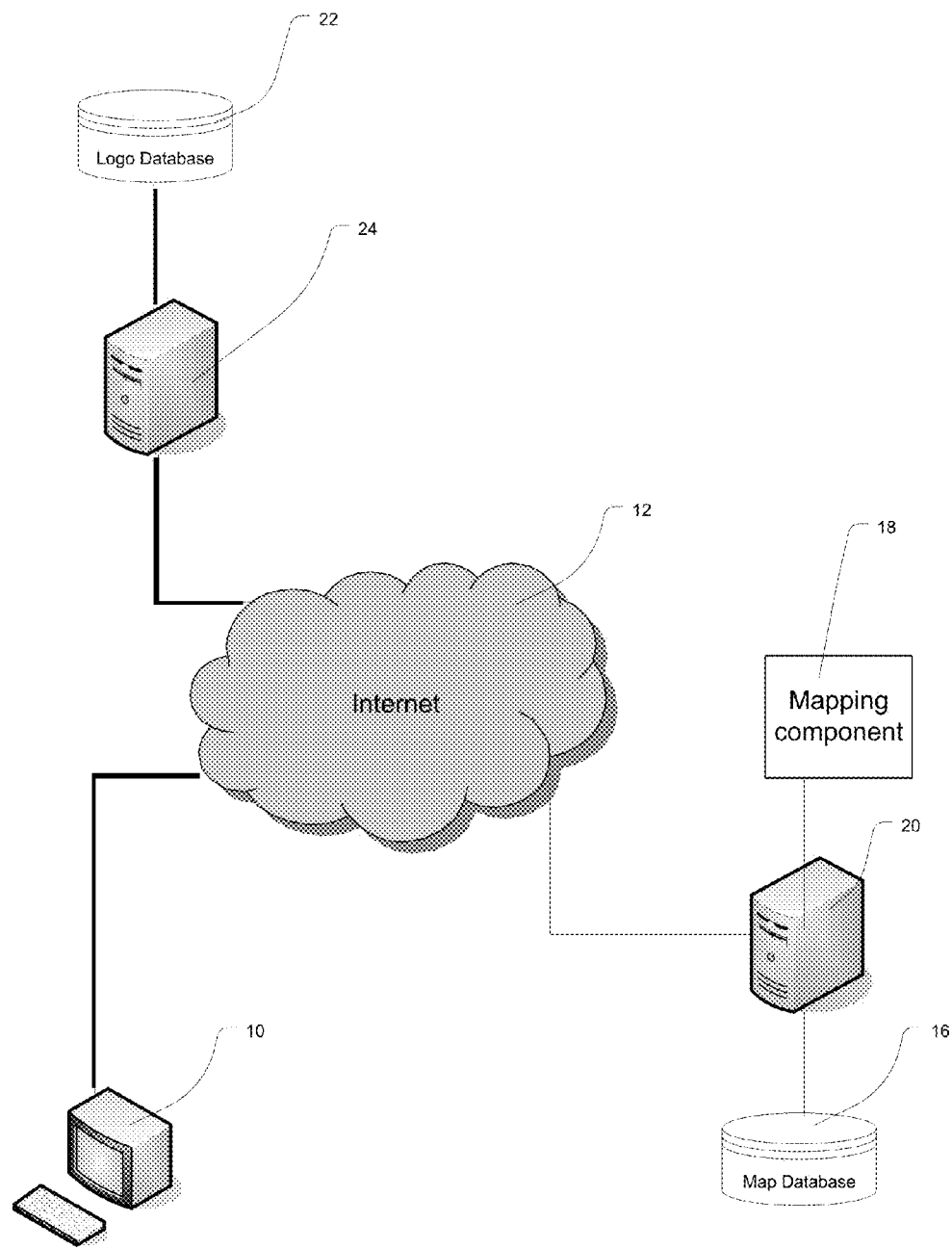
FIG. 1 illustrates an embodiment of a cartographic mapping system in accordance with the principles of the disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the systems, methods, and processes of identifying and advertising businesses and other establishments by overlaying image files on cartographic mapping applications are disclosed and described, it is to be understood that this disclosure is not limited to the particular embodiments, configurations, or process steps disclosed herein as such embodiments, configurations, or process steps may vary somewhat. It is also to be understood that the terminology employed herein is used for the purpose of describing particular embodiments only and is not intended to be limiting since the scope of the disclosure will be limited only by the appended claims, if any, and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, un-recited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "logo" refers broadly to words, names, symbols, sounds, colors, or other elements that distinguish goods or services from those manufactured or sold by others and indicates the source of the goods or services. For instance, "logo" refers to a graphical element (ideogram, symbol, emblem, icon, sign) that, together with its logotype (a uniquely set and arranged typeface), forms a trademark, commercial brand, or other source-identifying function, which may be used to identify organizations and other non-commercial entities.

As used herein, the term "geobrowser" refers broadly to a web-based interactive cartographic map viewer. Thus, a geobrowser may include, for example, the following map applications: MapQuest®, Google® Maps, Yahoo!® Maps, Google® Earth, Microsoft® Virtual Earth®, Yahoo® Maps, and other mapping applications.

As used herein, the phrase "navigation products" refers broadly to GPS (Global Positioning System) based products, which may include handheld units, integrated units in mobile devices, automotive and other transportation devices.

As used herein, the phrase "image file" refers broadly to any digital or electronic file format used for reproducing an image. For example, image files may include, among others: (1) JPEG (Joint Photographic Experts Group), file extension JPG; (2) TIFF (Tagged Image File Format), file extension TIFF or TIF; (3) RAW (Raw Image Formats); (4) PNG (Portable Network Graphics), file extension PNG; (5) GIF (Graphic Interchange Format), file extension GIF; (6) PPM (Portable Piximap), file extension PPM; (7) PGM (Portable Graymap), file extension PGM; (8) PBM (Portable Bitmap), file extension PBM; (9) PMN (Portable Anymap), file extension PMN; (10) SWF (Small Web Format), file extension SWF; (11) CGM (Computer Graphics Metafile), file extension CGM; and (12) SVG (Scalable Vector Graphics), file extension SVG. It will appreciated that the image files may also include GeoSpatial files, such as (1) KML (Keyhole Markup Language), file extension KML or KMZ; (2) XML (Extensible Markup Language), file extension XML for geographical information; (3) GML (Geography Markup Language), file extension GML; and (4) GeoRSS, file extension RSS, XML.

As used herein the term "entity" is used to describe a real world physical item such as a building, person, business, etc. An entity may be a building, plat, parcel or the like, having or defining an area referred to sometimes as a footprint herein.

Applicant has developed a system, method, and process for displaying image files of logos, trademarks, or other source identifying objects, such as a trade name or the like, that are used to identify or advertise a business or other establishment using various cartographic mapping applications, such as internet or online mapping applications, geobrowser applications, geospatial software applications, GPS mapping applications, such as navigation systems, or other mapping products or applications. Applicant has thus conceived of a system, method, and process of identifying and advertising businesses and other establishments by overlaying image files on various cartographic mapping applications, such as MapQuest®, Google® Maps, Yahoo!® Maps, Microsoft® Virtual Earth® and other mapping applications.

Referring now to FIG. 1, an embodiment of the cartographic mapping system providing logo information of the disclosure is illustrated and may comprise a user device 10 for receiving or viewing information, a network 12 for providing and receiving information, a mapping server 14 for providing cartographic mapping information to a user, a mapping database 16 for storing information specific to a cartographic mapping application, a mapping program or mapping application 18, such as MapQuest®, Google® Maps, Yahoo!® Maps, Microsoft® Virtual Earth® or other mapping applications, and a computing platform 20. The system may further comprise a logo database 22 and a logo server 24 for providing logo data on to the system. It will be appreciated that the user device 10 may be any device capable of receiving information, such as an image file, over a network, such as a mobile phone, a GPS unit, a computer, a PDA, or another device capable of receiving information. The network may be a worldwide network, such as the Internet, or it may be any other type of network known or that may become known in the future. It will be appreciated that the network 12 may be wired or wireless.

As illustrated in FIG. 1, a cartographic mapping application or program 18 may be run on the computing platform and may provide mapping information stored on the mapping database 16 via the mapping server 14 over a network to the user device 10. For example, MapQuest®, Google® Maps, Yahoo!® Maps, Microsoft® Virtual Earth® and other mapping applications may be accessed by a user via the user device 10, such as a mobile phone, over the Internet. The logo information and the mapping information may be combined in the form of layers. The logo information and the mapping information may come from the same provider and combined before being broadcast onto the Internet. The logo information and the mapping information may be provided from different users and combined after the respective information has been broadcast on to the internet, as is seen in FIG. 1. The logo information may be graphical information similar to a user's trademark or may be a promotional image. The logo information may comprise a text portion or a symbol portion. The text portion may comprise company information or may portray information relevant in time, such as a currently running special on products or services being offered. The additional information may be advertising in general. For example, an entertainment venue may wish to attract a certain segment of the population to come into the establishment. Accordingly, additional text may be rendered next to the logo image rendered on the map offering to let the desired segment of the population in for free. Other examples and embodiments may be sales information, product introduction, scheduling availability, and statistical information. The rendering of the information may be predetermined or may be changed on the fly by an administrator. An additional embodiment may allow a client user access to a portion or all of the rendered logo information such that the client may change the information from a terminal through the system. Such a system would provide at least the advantage of allowing a client user to control traffic to the business in relative real time. A software client or program may be provided to a user for allowing access to the logo system. An embodiment may further include a web portal for accessing the system.

On the back end, or administration end, an approval process may be implemented. The approval process may be automated through the use of a computer executing a set of instructions. The approval process may be manual where a person may manually approve the information to be rendered. It may further be prudent to provide a system wherein an employee of the logo service provider manages a client and be on hand to enter additional information.

Additionally a security system may be employed for securing access to the logo providing system. Such a security system could require passwords or other authentication in order to provide information into the system or change information within the system. Accordingly, the system may employ an account organization wherein information and data are assigned to an account corresponding to a displayed logo.

Figure 2:
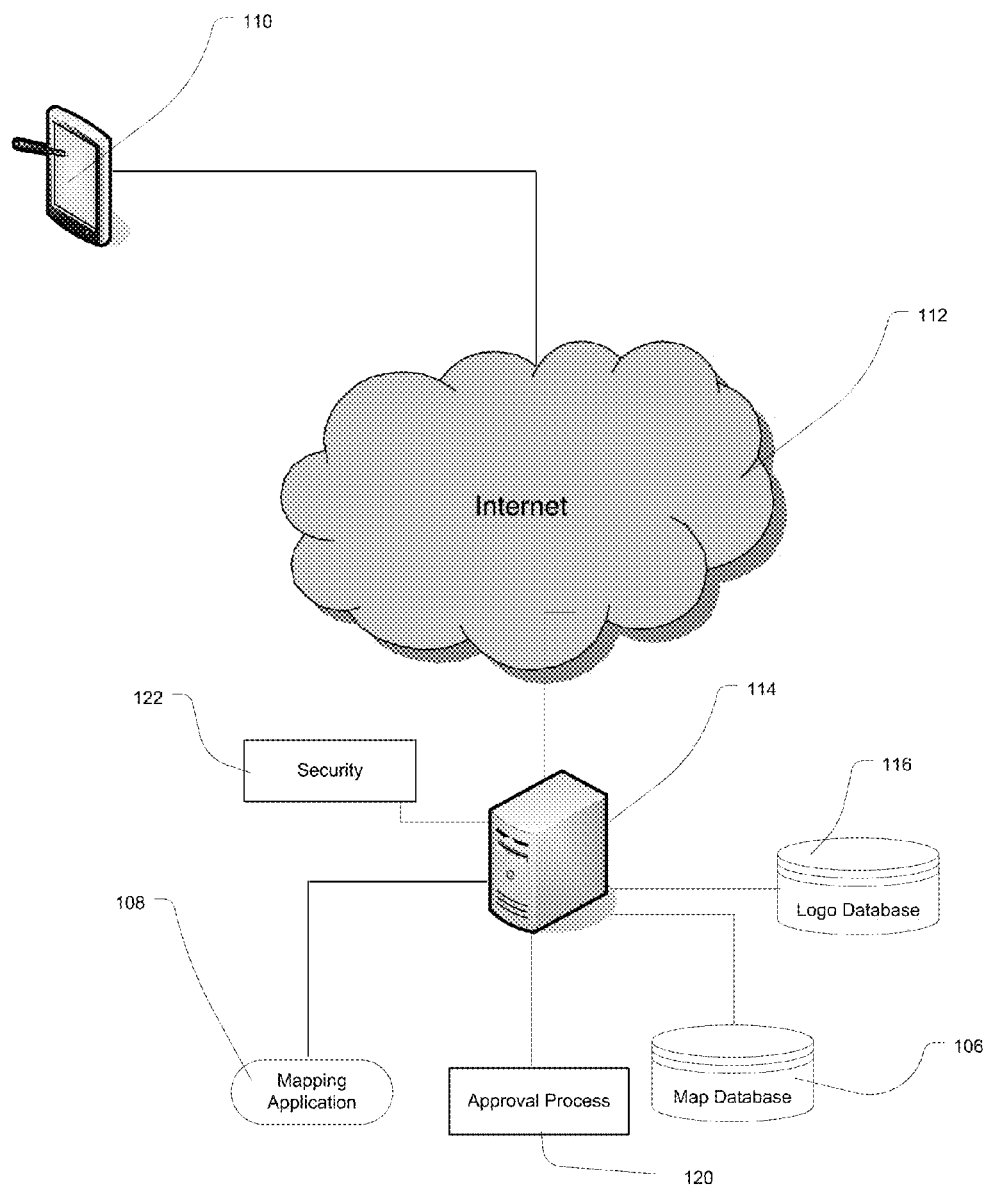
FIG. 2 illustrates an embodiment of a cartographic mapping system in accordance with the principles of the disclosure.

Referring to FIG. 2, an embodiment of the cartographic mapping system of the disclosure is illustrated and may comprise a user device 110 for receiving or viewing information, which itself may include a mapping database 106 for storing mapping information and mapping program or mapping application 108, such as Google® Earth, for running a set of mapping instructions or application software. The system may further comprise a network 112 for providing and receiving information, a mapping provider server 114 for providing mapping information to a user, and a mapping provider logo database 116 for storing information specific to a mapping application. The logo information and the mapping information may be combined in the form of layers. The logo information and the mapping information populating the databases may come from the same provider and combined before being broadcast onto the Internet, as seen in FIG. 2. The logo information and the mapping information populating the data bases may be provided from different users and combined after the respective information has been broadcast on to the internet. The logo information may be graphical information similar to a user's trademark or may be a promotional image. The logo information may comprise a text portion or a symbol portion. The text portion may comprise company information or may portray information relevant in time, such as a currently running special on products or services being offered. The additional information may be advertising in general. For example, an entertainment venue may wish to attract a certain segment of the population to come into the establishment. Accordingly, additional text may be rendered next to the logo image rendered on the map offering to let the desired segment of the population in for free. Other examples and embodiments may be sales information, product introduction, scheduling availability, and statistical information. The rendering of the information may be predetermined or may be changed on the fly by an administrator. An additional embodiment may allow a client user access to a portion or all of the rendered logo information such that the client may change the information from a terminal through the system. Such a system would provide at least the advantage of allowing a client user to control traffic to the business in relative real time. A software client or program may be provided to a user for allowing access to the logo system. An embodiment may further include a web portal for accessing the system.

On the back end, or administration end, an approval process 120 maybe implemented. The approval process may be automated through the use of a computer executing a set of instructions. The approval process may be manual where a person may manually approve the information to be rendered. It may further be prudent to provide a system wherein an employee of the logo service provider manages a client and be on hand to enter additional information.

Additionally a security system 122 may be employed for securing access to the logo providing system. Such a security system could require passwords or other authentication in order to provide information into the system or change information within the system. Accordingly, the system may employ an account organization wherein information and data are assigned to an account corresponding to a displayed logo.

Figure 3:
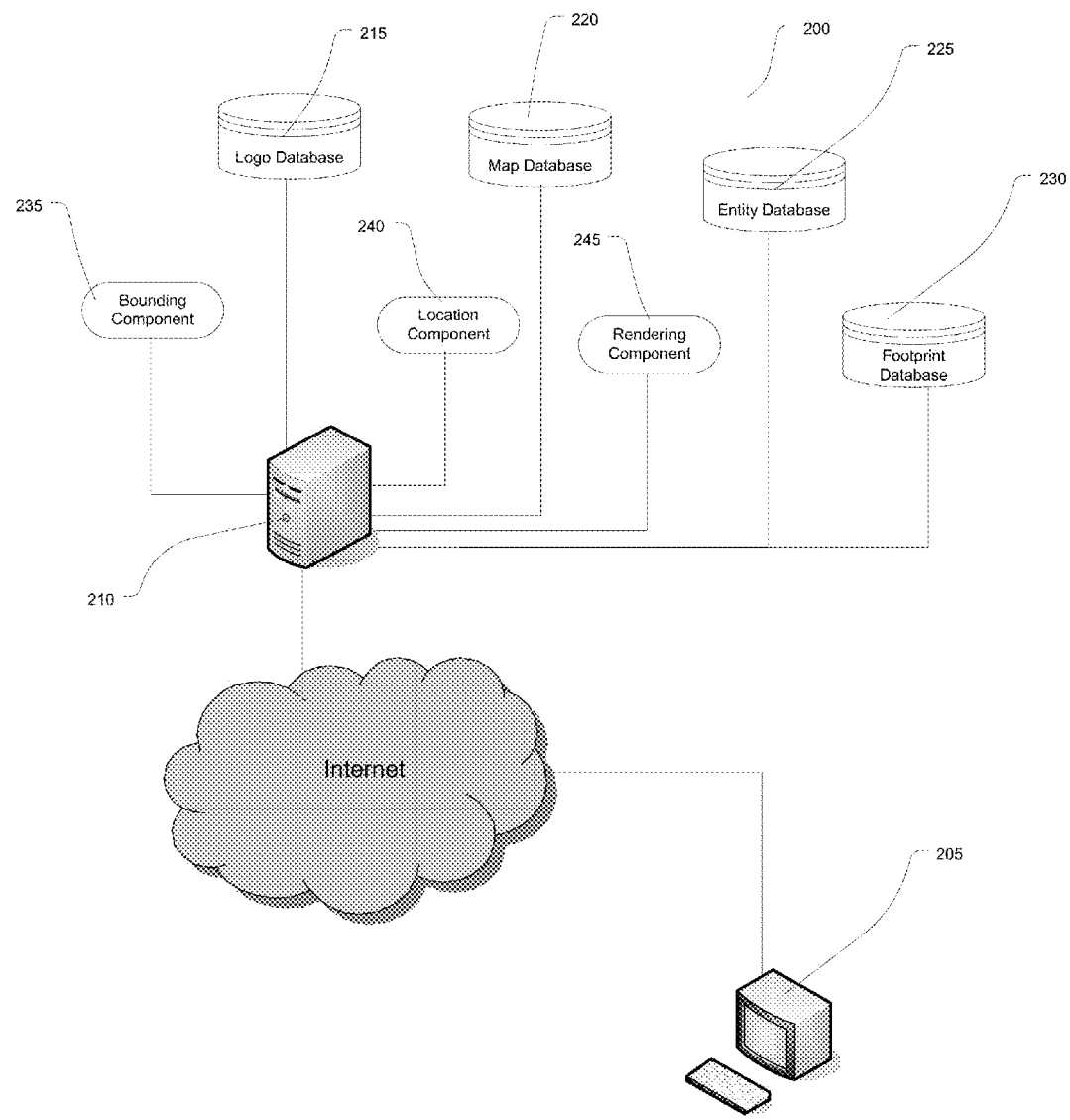
FIG. 3 illustrates an embodiment of a system for providing logo information on a map from a single provider in accordance with the principles of the disclosure.

With reference to FIG. 3 an embodiment of a system for providing logo information on a map from a single provider will be discussed in greater detail. The system 200 may be accessed by a user from a user device 205. The user device may be connected to the Internet, thereby allowing access to the system 200, which is also connected to the Internet. The system 200 may connect to the Internet through a server 210 or a plurality of servers. The server 200 may provide the computing processes or may simply broadcast the data on to the Internet. The system 200 may further comprise a series of databases for differing categories of data to be combined into a final rendering to a user through a user device 205. One such database may be a logo database 215 having logo data thereon. Logo data may include image data and text data as discussed above. Another such database may be a map database 220 comprising map data there on. The logo information and the mapping information populating the data bases may be provided from different users and combined after the respective information has been broadcast on to the internet. The logo information may be graphical information similar to a user's trademark or may be a promotional image. The logo information may comprise a text portion or a symbol portion. The text portion may comprise company information or may portray information relevant in time, such as a currently running special on products or services being offered. The additional information may be advertising in general. For example, an entertainment venue may wish to attract a certain segment of the population to come into the establishment. Accordingly, additional text may be rendered next to the logo image rendered on the map offering to let the desired segment of the population in for free. Other examples and embodiments may be sales information, product introduction, scheduling availability, and statistical information. The rendering of the information may be predetermined or may be changed on the fly by an administrator. An additional embodiment may allow a client user access to a portion or all of the rendered logo information such that the client may change the information from a terminal through the system. Such a system would provide at least the advantage of allowing a client user to control traffic to the business in relative real time. A software client or program may be provided to a user for allowing access to the logo system. An embodiment may further include a web portal for accessing the system.

The system 200 may further include an entity database 225 have entity data therein related to entity characteristics, such as dimensions and occupants. The entity may be a building, plat, parcel or the like, having or defining an area referred to sometimes as a footprint herein. The system 200 may further have a footprint database 230 comprising area values that represent the physical footprint an entity has. The footprint data may be used to determine the size of a logo image. The footprint data may be used by a bounding component 235 in order to determine the appropriate size for a logo image rendered by the system 200. The bounding component 235 may be a set of operational instructions and may be computer implemented. The bounding component 235 may also be manually performed by an administrative employee. The bounding component 235 may employ an edge detection routine where the edges of a building or parcel are determined and recorded into memory for use by the bounding component 235.

The system 200 may further comprise a location component 240 for processing the location of logos to be placed and building locations. A building location may be expressed in many differing ways such as by a coordinate system comprising latitude and longitude or polar. Other embodiments may use address information and yet other embodiments may use meets and bounds descriptions. It should be appreciated that the scope of the disclosure is intended to cover many divergent location methods known or yet to me discovered. Additionally, in instances where a building has not yet been erected the system may use parcel or plot designations for both location information and bounding information. The system 200 may also comprise a rendering component 245 wherein said rendering component compiles an output, usually in the form of an image. However, there may be applications and situations were a non-image out put would be desirable. One such example would be when converting between computing platforms. When converting between computing platforms it may be more efficient to use a non-data output wherein the secondary computing platform then produces an image. The rendering component 245 may treat the incoming data as layers as is currently common in the industry. The rendering component 245 may be the only component in the system that recognizes differing computer platforms thereby allowing any underlying system components to operate without consideration of computing platform or language.

Figure 4:
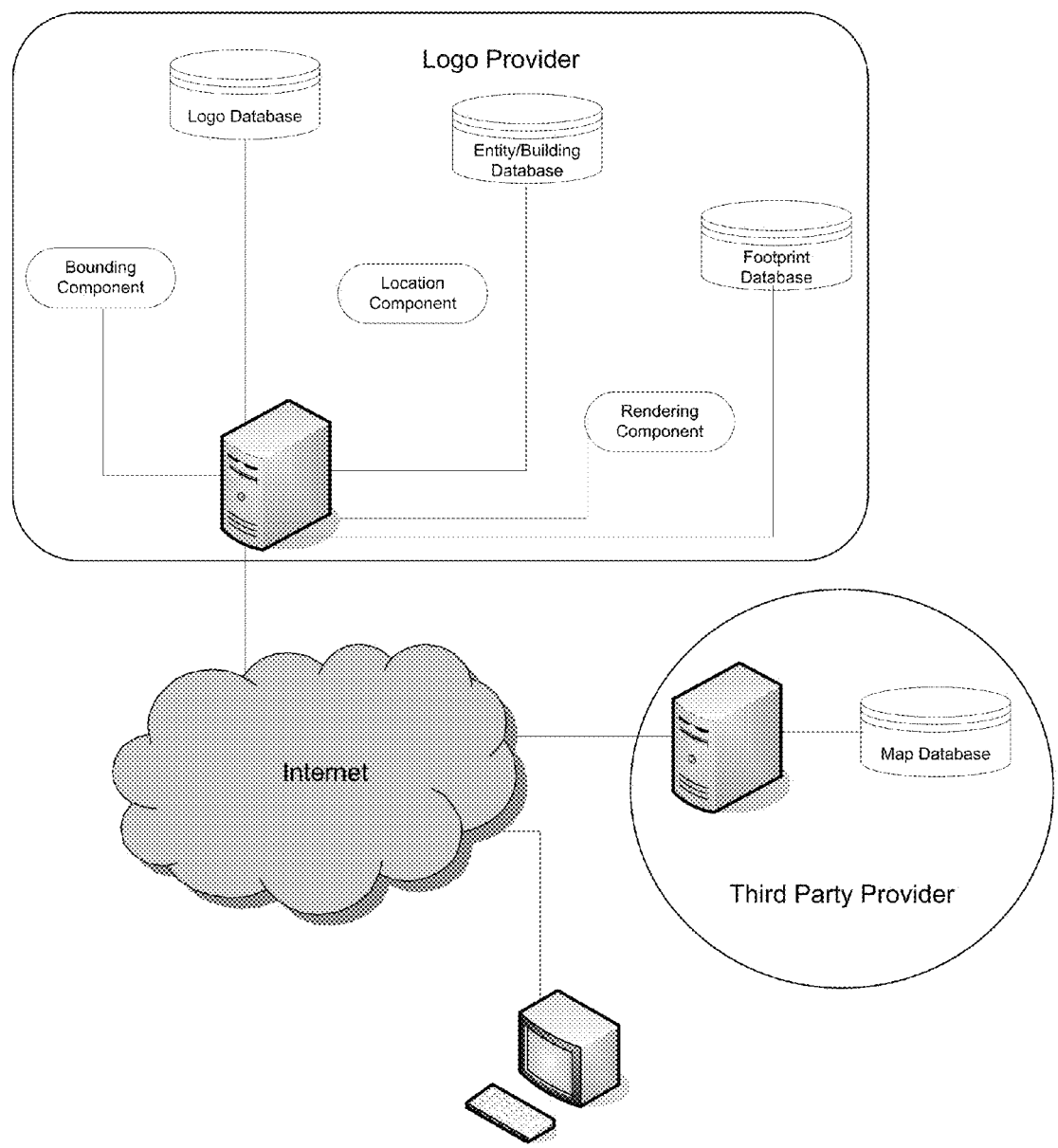
FIG. 4 illustrates an embodiment of a system for providing logo information on a third party map from a third party provider in accordance with the principles of the disclosure.

With reference to FIG. 4 an embodiment of a system for providing logo information on a third party map from a third party provider will be discussed in greater detail. The system 300 may be accessed by a user from a user device 305. The user device may be connected to the Internet, thereby allowing access to the system 300, which is also connected to the Internet. The system 300 may connect to the Internet through a server 310 or a plurality of servers. The server 300 may provide the computing processes or may simply broadcast the data on to the Internet. The system 300 may further comprise a series of databases for differing categories of data to be combined into a final rendering to a user through a user device 305. One such database may be a logo database 315 having logo data thereon. Logo data may include image data and text data as discussed above. The system 300 may further include a building database 325 have building data therein related to building characteristics, such as dimensions and occupants. The system 300 may further have a footprint database 330 comprising area values that represent the physical footprint a building has. The footprint data may be used to determine the size of a logo image. The footprint data may be used by a bounding component 335 in order to determine the appropriate size for a logo image rendered by the system 300. The bounding component 335 may be a set of operational instructions and may be computer implemented. The bounding component 335 may also be manually performed by an administrative employee. The bounding component 335 may employ an edge detection routine where the edges of a building or parcel are determined and recorded into memory for use by the bounding component 335.

The system 300 may further comprise a location component 340 for processing the location of logos to be placed and building locations. A building location may be expressed in many differing ways such as by a coordinate system comprising latitude and longitude or polar. Other embodiments may use address information and yet other embodiments may use meets and bounds descriptions. It should be appreciated that the scope of the disclosure is intended to cover many divergent location methods known or yet to me discovered. Additionally, in instances where a building has not yet been erected the system may use parcel or plot designations for both location information and bounding information. The system 300 may also comprise a rendering component 345 wherein said rendering component compiles an output, usually in the form of an image. However, there may be applications and situations were a non-image out put would be desirable. One such example would be when converting between computing platforms. When converting between computing platforms it may be more efficient to use a non-data output wherein the secondary computing platform then produces an image. The rendering component 345 may treat the incoming data as layers as is currently common in the industry. The rendering component 345 may be the only component in the system that recognizes differing computer platforms thereby allowing any underlying system components to operate without consideration of computing platform or language. The system 300 may then be ready to overly or combine its output with a third party provide map.

In this embodiment a third party may provide a base map layer and provide a corresponding map database 320 comprising map data thereon. In such an embodiment access and control could be seamless and transparent to a user. Such an embodiment would allow rendered logo layer to be associated and rendered with several map providers such as the ones enumerated above. The logo information and the mapping information populating the data bases may be provided from different users and combined after the respective information has been broadcast on to the internet. The logo information may be graphical information similar to a user's trademark or may be a promotional image. The logo information may comprise a text portion or a symbol portion. The text portion may comprise company information or may portray information relevant in time, such as a currently running special on products or services being offered. The additional information may be advertising in general. For example, an entertainment venue may wish to attract a certain segment of the population to come into the establishment. Accordingly, additional text may be rendered next to the logo image rendered on the map offering to let the desired segment of the population in for free. Other examples and embodiments maybe sales information, product introduction, scheduling availability, and statistical information. The rendering of the information may be predetermined or may be changed on the fly by an administrator. An additional embodiment may allow a client user access to a portion or all of the rendered logo information such that the client may change the information from a terminal through the system. Such a system would provide at least the advantage of allowing a client user to control traffic to the business in relative real time. A software client or program may be provided to a user for allowing access to the logo system. An embodiment may further include a web portal for accessing the system. The third party provider may accordingly have its own accounting of clients and users.

Figure 5:
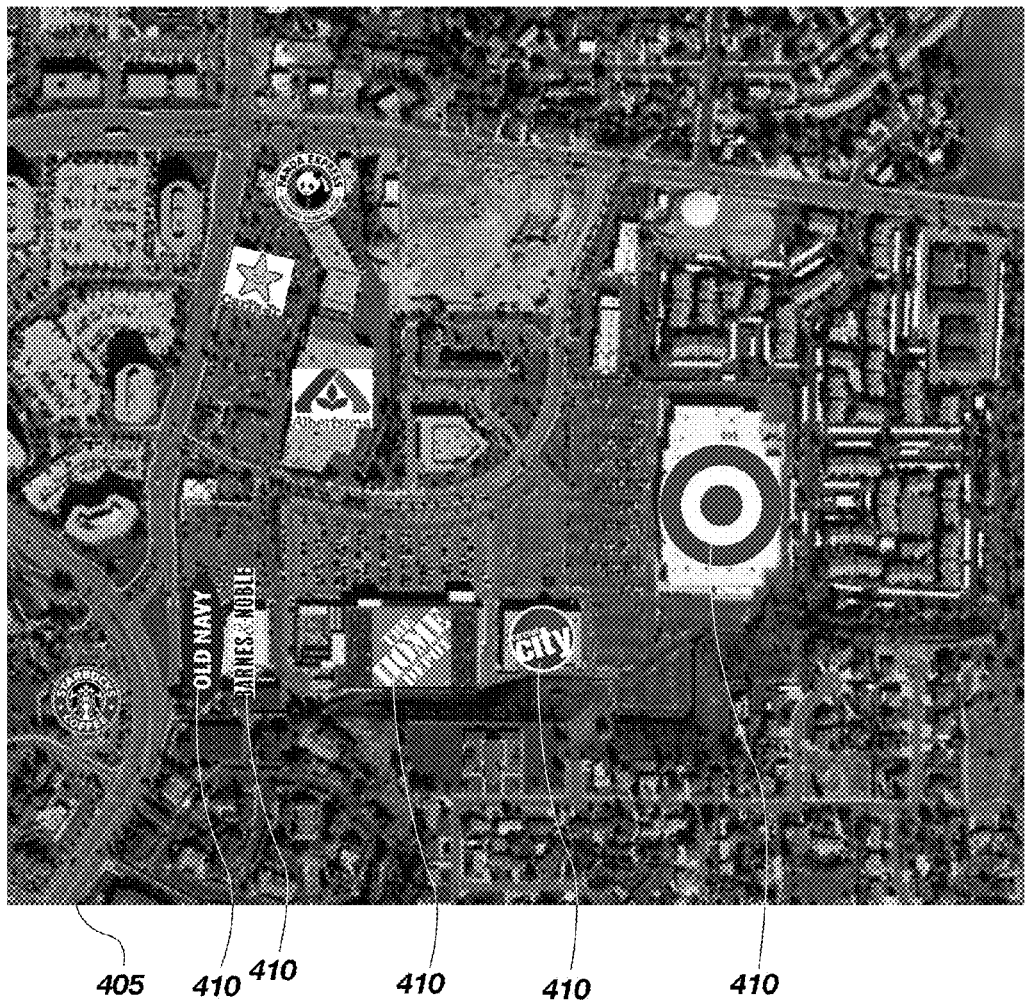
FIG. 5 illustrates an embodiment of a logo image file overlaid on a two-dimensional cartographic mapping application and an image file overlaid on a three-dimensional cartographic mapping application in accordance with the principles of the disclosure.
Figure 6:
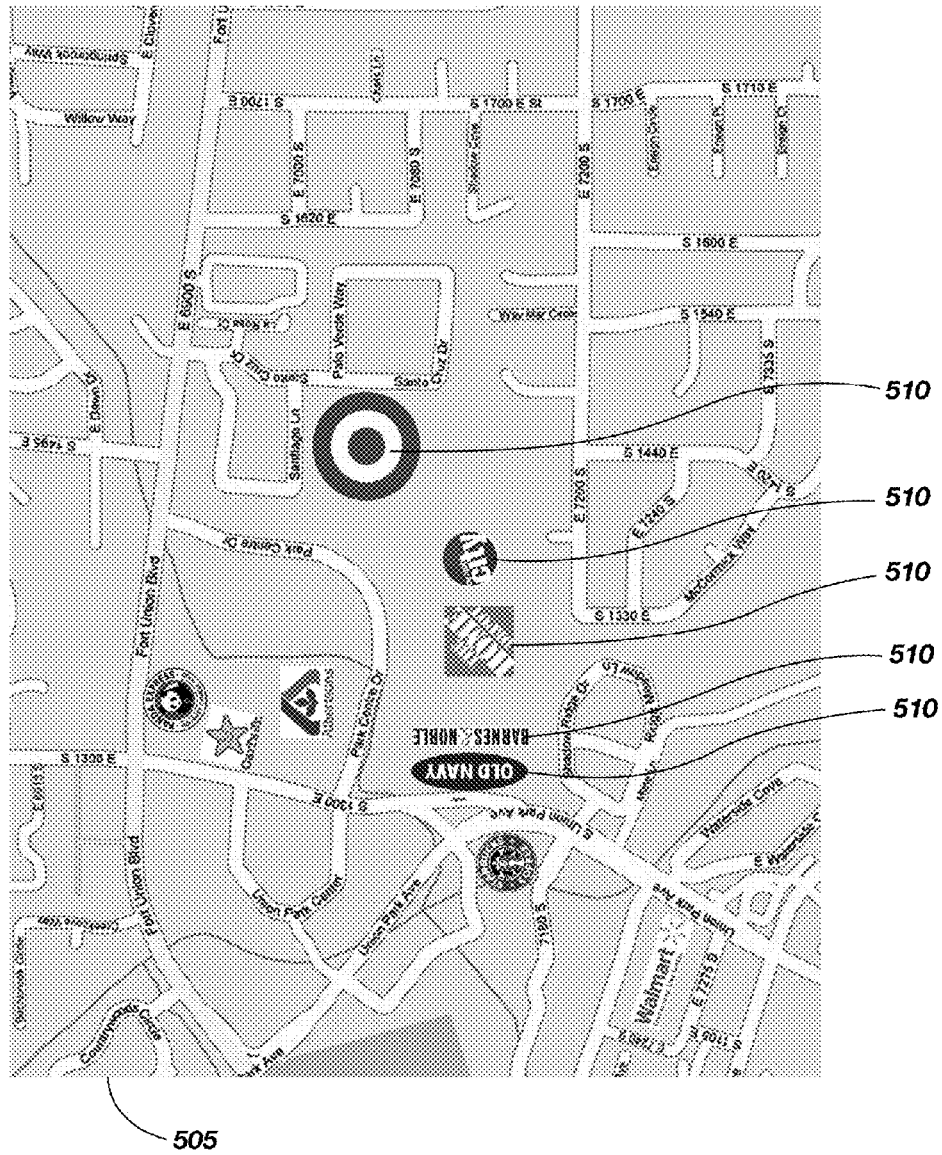
FIG. 6 illustrates an embodiment of a logo image file overlaid on a two-dimensional cartographic mapping application and an image file overlaid on a three-dimensional cartographic mapping application in accordance with the principles of the disclosure.

FIGS. 5 and 6 illustrate representative embodiments of a logo image file overlaid on a two-dimensional cartographic mapping application and an image file, such as a two-dimensional image file, overlaid on a three-dimensional cartographic mapping application in accordance with the principles of the disclosure. It will be appreciated that the image files and logos disclosed herein may be used in conjunction with either embodiment illustrated in FIGS. 1-4 discussed above. FIG. 5 illustrates an embodiment of a rendering showing an aerial or satellite image as a base layer 405 and various logo images 410 placed on buildings within the photo base layer 405. FIG. 6 illustrates an embodiment of a rendering showing a graphical map base layer 505 and various logo images 510 placed at locations representing their real world representative counterpart.

Figure 7:
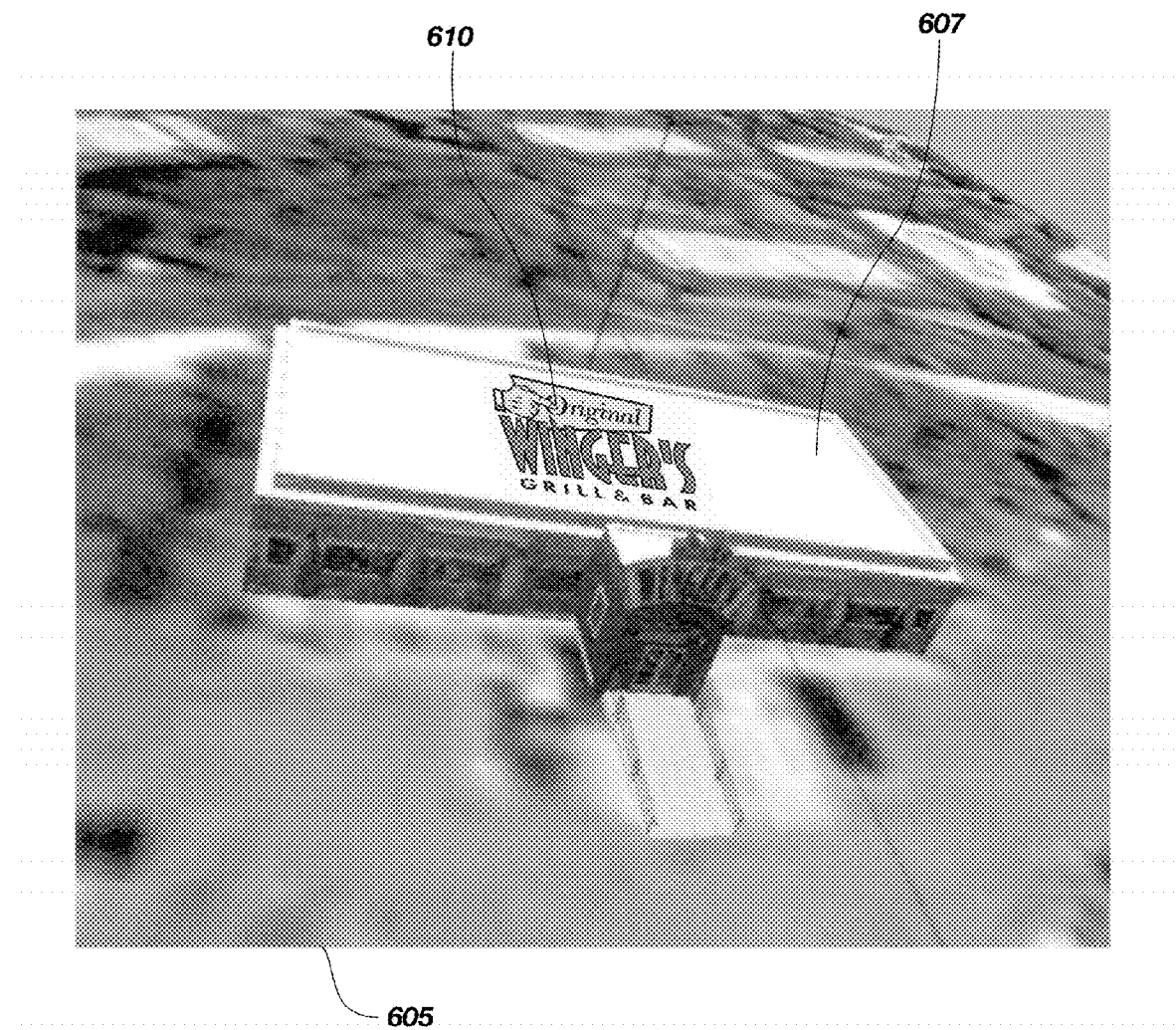
FIG. 7 illustrates an embodiment of the disclosure wherein a logo image is rendered on top of a three-dimensional rendered building and having an image base layer in accordance with the principles of the disclosure.

FIG. 7 illustrates an embodiment wherein a logo image 610 is rendered on the top of a three-dimensional rendered building 607 and having an image base layer 605. Many map providers are offering three-dimensional effects in their outputs. The systems as disclosed herein are applicable to three-dimensional renderings. In three-dimensional renderings it may be desirable to have the logo image correspond to the perspective of the base layer. In such an application it may be desirable to have a perspective component for applying the proper perspective to a logo image.

Figure 8:
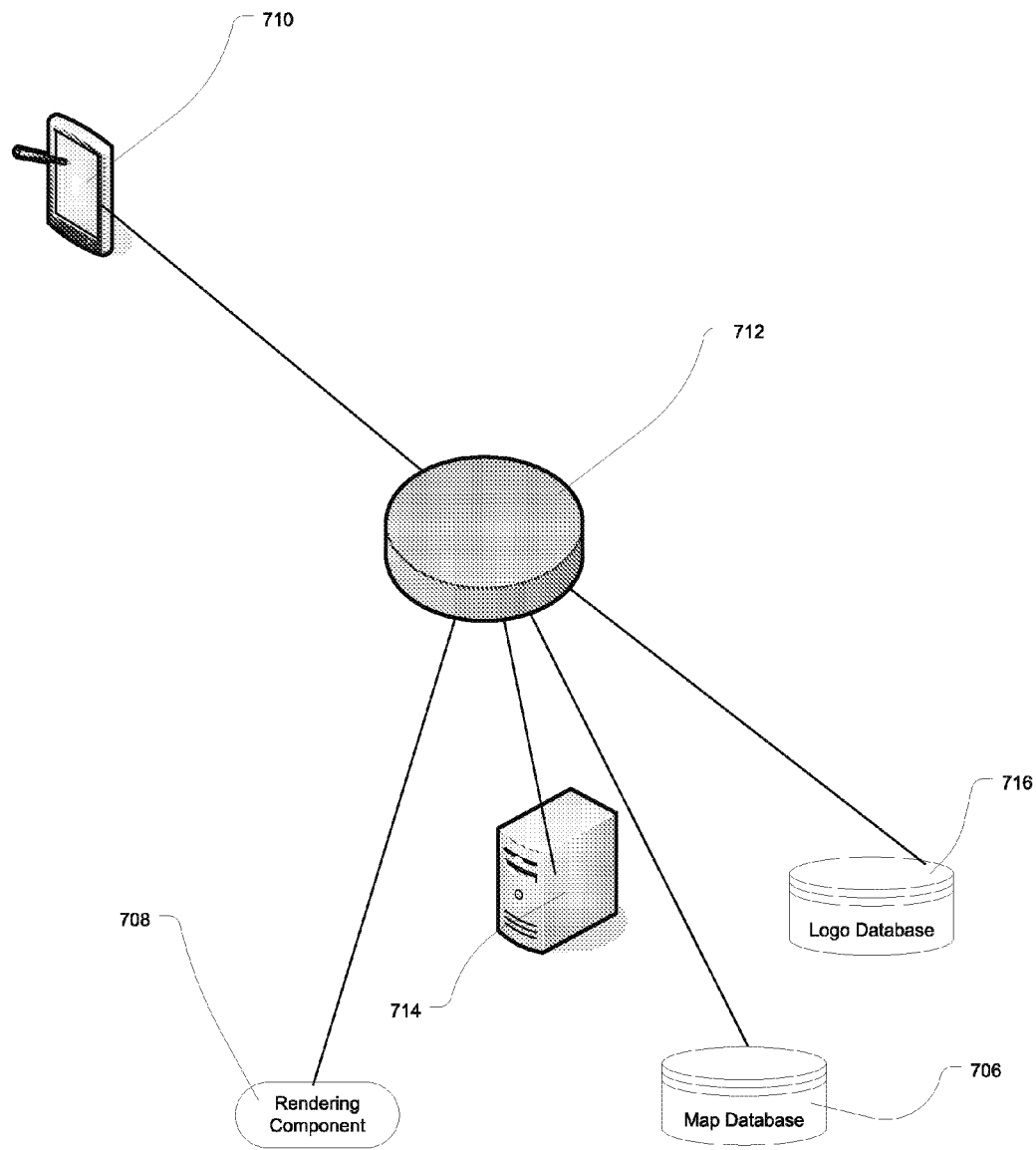
FIG. 8 illustrates an embodiment of a mapping system providing logo information for a map over a closed network in accordance with the principles of the disclosure.

Referring to FIG. 8, an embodiment of a mapping system providing logo information for a map over a closed network is illustrated and may comprise a user device 710 for receiving or viewing information, which itself may include a mapping database 706 for storing mapping information and mapping program or mapping application 708, such as a proprietary system or military system, for running a set of mapping instructions or application software. The system may further comprise a closed network 712 for providing and receiving information, a mapping server 714 for providing mapping information to a user, and a mapping provider logo database 716 for storing information specific to a mapping application. The logo information and the mapping information may be combined in the form of layers. The logo information and the mapping information populating the databases may come from the same provider and combined before being broadcast onto the Internet. The logo information may be graphical information similar to a user's trademark or may be a promotional image. The logo information may comprise a text portion or a symbol portion. The rendering of the information may be predetermined or may be changed on the fly by an administrator. An additional embodiment may allow a client user access to a portion or all of the rendered logo information such that the client may change the information from a terminal through the system. Such a system would provide at least the advantage of allowing a client user to control traffic to the business in relative real time. A software client or program may be provided to a user for allowing access to the logo system. An embodiment may further include a web portal for accessing the system. Additionally a security system may be employed for securing access to the logo providing system. Such a security system could require passwords or other authentication in order to provide information into the system or change information within the system. Accordingly, the system may employ an account organization wherein information and data are assigned to an account corresponding to a displayed logo.

Figure 9:
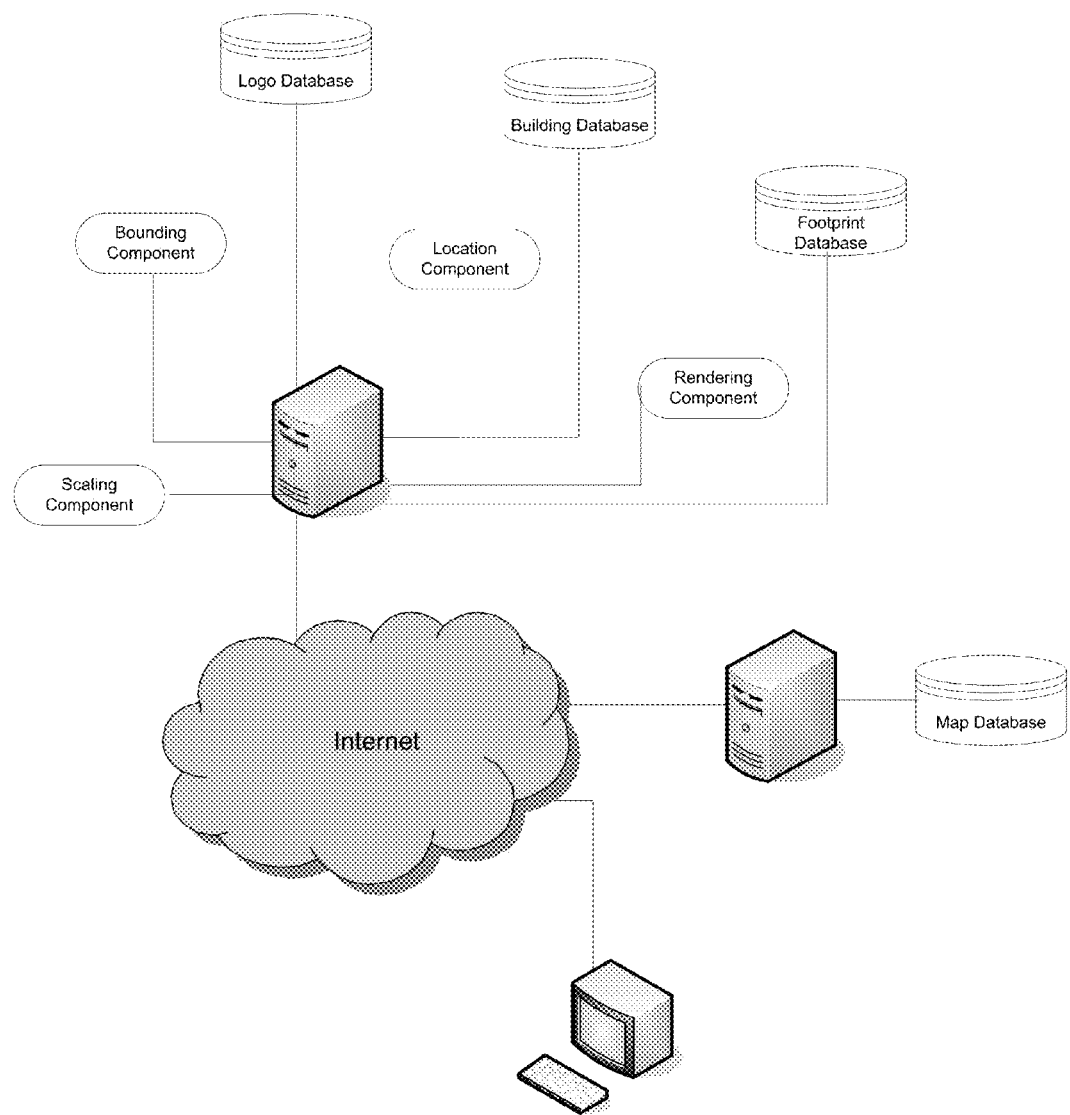
FIG. 9 illustrates an embodiment of the disclosure comprising a scaling component in accordance with the principles of the disclosure.

Illustrated in FIG. 9 is an embodiment that may comprise a scaling component. The system 900 may be accessed by a user from a user device 905. The user device may be connected to the Internet, thereby allowing access to the system 900, which is also connected to the Internet. The system 900 may connect to the Internet through a server 910 or a plurality of servers. The server 900 may provide the computing processes or may simply broadcast the data on to the Internet. The system 900 may further comprise a series of databases for differing categories of data to be combined into a final rendering to a user through a user device 905. One such database may be a logo database 915 having logo data thereon. Logo data may include image data and text data as discussed above. The system 900 may further include a building database 925 have building data therein related to building characteristics, such as dimensions and occupants. The system 900 may further have a footprint database 930 comprising area values that represent the physical footprint a building has. The footprint data may be used to determine the size of a logo image. The footprint data may be used by a bounding component 935 in order to determine the appropriate size for a logo image rendered by the system 900. The bounding component 935 may be a set of operational instructions and may be computer implemented. The bounding component 935 may also be manually performed by an administrative employee. The bounding component 935 may employ an edge detection routine where the edges of a building or parcel are determined and recorded into memory for use by the bounding component 935.

The system 900 may further comprise a location component 940 for processing the location of logos to be placed and building locations. A building location may be expressed in many differing ways such as by a coordinate system comprising latitude and longitude or polar. Other embodiments may use address information and yet other embodiments may use meets and bounds descriptions. It should be appreciated that the scope of the disclosure is intended to cover many divergent location methods known or yet to me discovered. Additionally, in instances where a building has not yet been erected the system may use parcel or plot designations for both location information and bounding information. The system 900 may also comprise a rendering component 945 wherein said rendering component compiles an output, usually in the form of an image. However, there may be applications and situations were a non-image out put would be desirable. One such example would be when converting between computing platforms. When converting between computing platforms it may be more efficient to use a non-data output wherein the secondary computing platform then produces an image. The rendering component 945 may treat the incoming data as layers as is currently common in the industry. The rendering component 945 may be the only component in the system that recognizes differing computer platforms thereby allowing any underlying system components to operate without consideration of computing platform or language. The system 900 may then be ready to overly or combine its output with a third party provide map.

In this embodiment a third party may provide a base map layer and provide a corresponding map database 920 comprising map data thereon. In such an embodiment access and control could be seamless and transparent to a user. Such an embodiment would allow rendered logo layer to be associated and rendered with several map providers such as the ones enumerated above. The logo information and the mapping information populating the data bases may be provided from different users and combined after the respective information has been broadcast on to the internet. The logo information may be graphical information similar to a user's trademark or may be a promotional image. The logo information may comprise a text portion or a symbol portion. The text portion may comprise company information or may portray information relevant in time, such as a currently running special on products or services being offered. The additional information may be advertising in general. For example, an entertainment venue may wish to attract a certain segment of the population to come into the establishment. Accordingly, additional text may be rendered next to the logo image rendered on the map offering to let the desired segment of the population in for free. Other examples and embodiments maybe sales information, product introduction, scheduling availability, and statistical information. The rendering of the information may be predetermined or may be changed on the fly by an administrator. An additional embodiment may allow a client user access to a portion or all of the rendered logo information such that the client may change the information from a terminal through the system. Such a system would provide at least the advantage of allowing a client user to control traffic to the business in relative real time. A software client or program may be provided to a user for allowing access to the logo system. An embodiment may further include a web portal for accessing the system. The third party provider may accordingly have its own accounting of clients and users. A scaling component 955 would ensure that the logo image is of proper size to fit within the bounds of a building or parcel as a user either zooms in or out. In an embodiment the scaling component 955 may prescribe a limit as to how small or large a logo can get. For example, if a user zooms out by an amount that make the footprints of buildings relatively small, a corresponding logo image may not be legible due to its small size. An embodiment may have a scaling component 955 that may prescribe a limit where the logo image ceases to shrink but stays a set size regardless of the zoom amount. In such a circumstance, logo images may crowd upon each other in the limited viewable area of a display. Therefore, it may be a function of the scaling component 955 to prescribe a priority to which logo stays visible and which ones are removed from view. The priority may be a function of admin control and may be something bargained for by a client/customer. The priority may be chosen by a user based on predetermined selectable criteria. The priority may be randomly selected automatically by the system.

Figure 10:
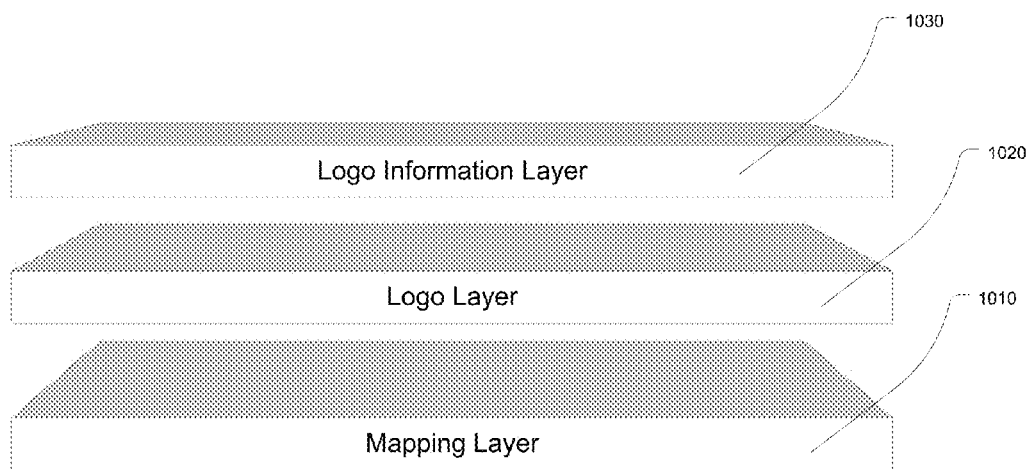
FIG. 10 illustrates a schematic of a layered rendering having logo information provided therein in accordance with the principles of the disclosure.

FIG. 10 illustrates a schematic of a layered rendering having logo information provided therein. A system may provide logo information in the form of layered data to be rendered in a predetermined order. As seen in FIG. 10, a mapping base layer 1010 is augmented by a logo layer 1020 containing logo image data, and logo information layer 1030 containing additional information associated with the logo image.

Figure 11:
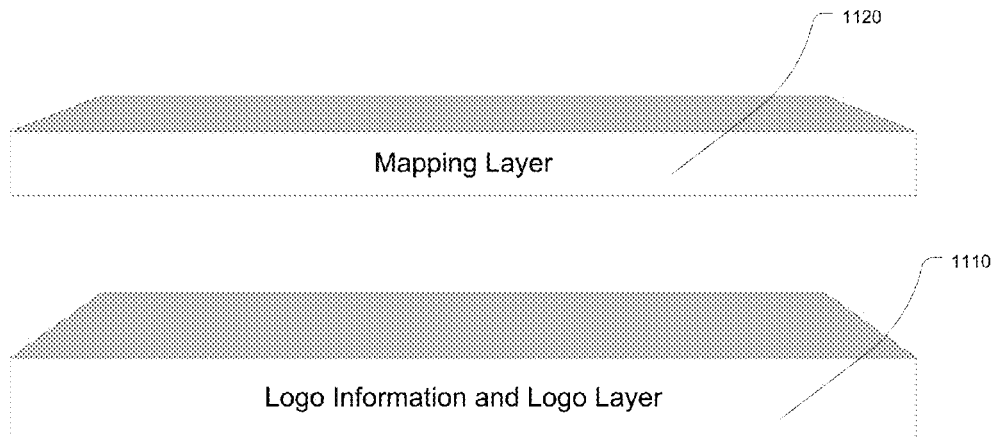
FIG. 11 illustrates a schematic of a layered rendering having logo information provided therein in accordance with the principles of the disclosure.

FIG. 11 illustrates a schematic of a layered rendering having logo information provided therein. A system may provide logo information in the form of layered data to be rendered in a predetermined order. As seen in FIG. 11 a mapping base layer 1110 is augmented by a logo layer 1120 containing logo image data and additional information associated with the logo image in a single layer.

Figure 12:
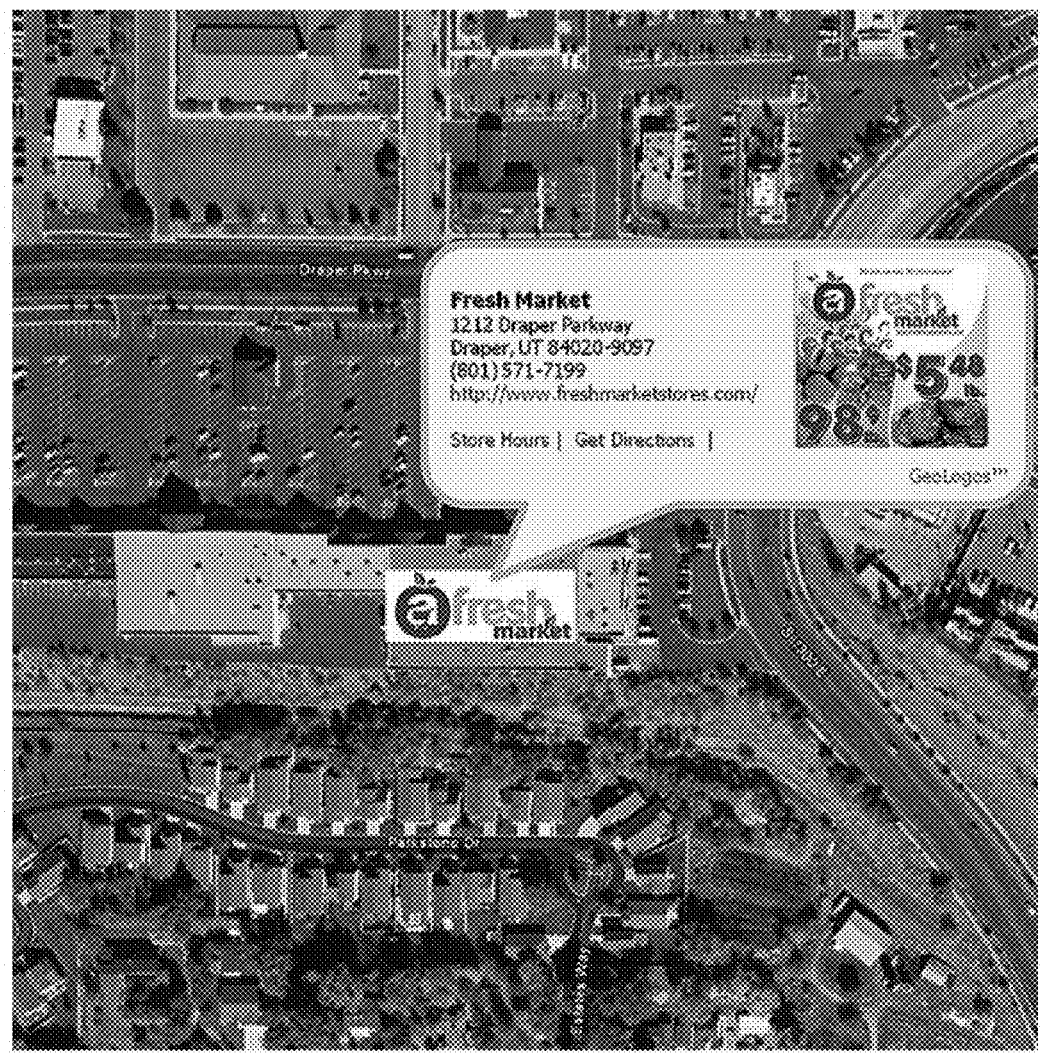
FIG. 12 illustrates a graphical example of how additional logo information may be shown in order to complement a logo image in accordance with the principles of the disclosure.

FIG. 12 illustrates a graphical example of how the additional logo information may be shown in order to complement the logo image. The specific example of FIG. 12 illustrates and grocery store logo image 1210 layered on top of an image base layer 1205. In the example, the additional logo information is shown in the form of a corresponding pop out comment box 1212. The additional information depicts a sale on items within the business corresponding to the logo.

Figure 13:
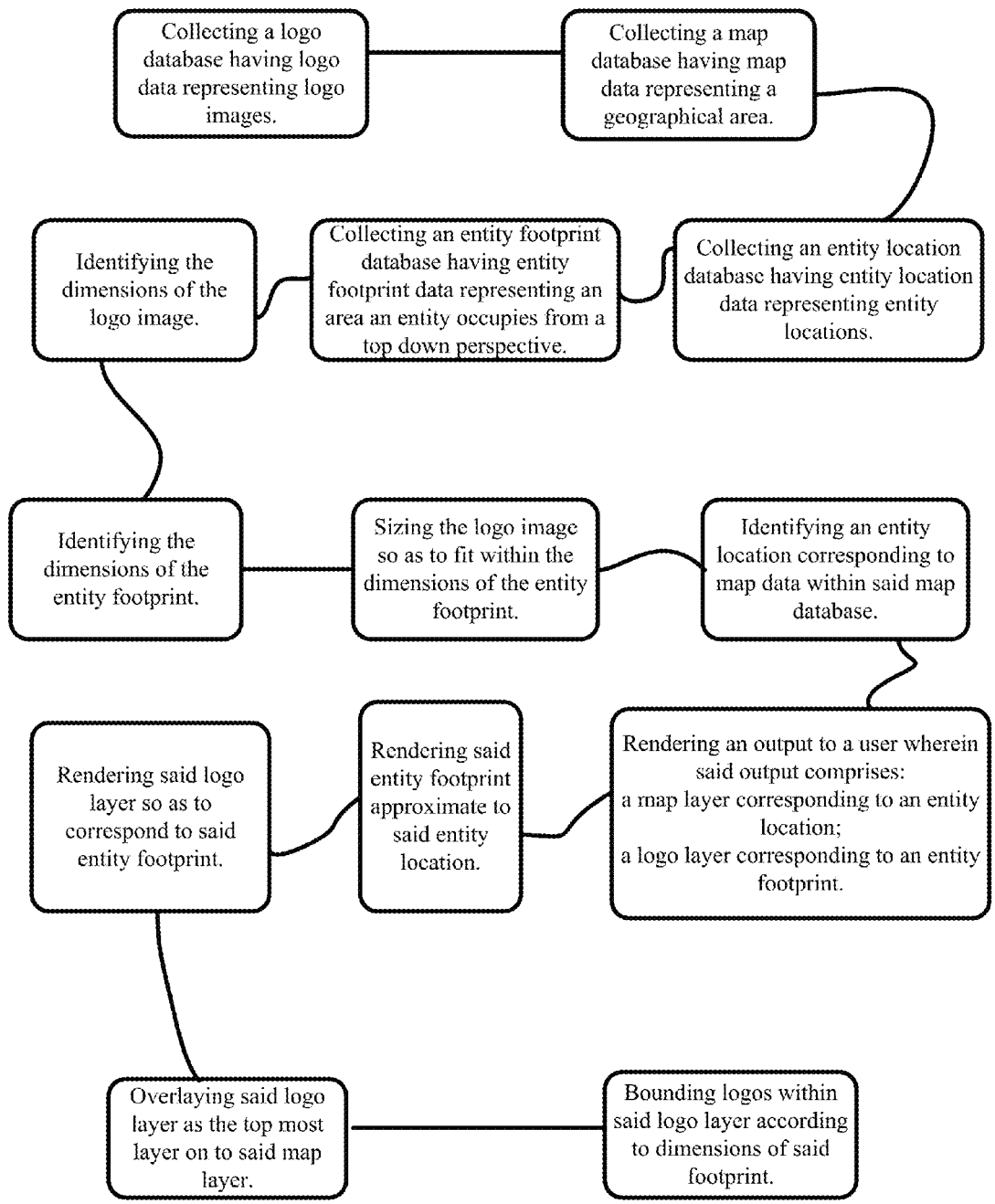
FIG. 13 illustrates a method of the disclosure in a flow chart form to depict the processes performed by an embodiment of a system consistent with the teachings of the disclosure.

FIG. 13 illustrates a method using a flow chart to depict the processes performed by an embodiment of a system consistent with the teachings of the disclosure. An embodiment of the system may collect logo data into a logo database and store said data in computer readable memory or storage. An embodiment of the system may collect map data into a map database and store said data in computer readable memory or storage. An embodiment of the method may perform the process of identifying the dimensions of the logo image the client has selected. The method may perform the process of collecting building footprint data into a database and store said data in computer readable memory or storage for later use. Collecting as used herein may include the process of creating the respective data, wherein the creation of said data may be done manually or may be derived from an automated process, such as for example an edge detection method performed by a computer. The method may further perform the process of collecting building location data into a database and storing the data in a computer readable form. An embodiment of the method may perform the process of identifying dimensions of building footprints and storing the data in computer readable form for later use. The dimension data may be represented by real world number that is then scaled by the computer for use. The dimensions may also be stored as scaled number and used the system in scaled calculations. The method may comprise the process of sizing the logo such that it will fit within the bounding dimensions of a corresponding footprint. It should be noted that as a user zooms in and out of map the logo may be increased or decreased in size to stay within the bounding footprint. It should also me noted that any object can be used to bound a logo like a parcel or plat, etc. Accordingly an identifying point location may be assigned to a logo and corresponding bounding location such that the two objects are conveniently paired. The system may comprise a rendering process for creating an output. As discussed above said output may be in the form of an layer, image, or raw data to be used in other processes.

Figure 14:
FIG. 14 illustrates a rendered output consistent with the disclosure showing additional information.

FIG. 14 illustrates a rendered output consistent with the disclosure and illustrating the addition of additional information in the output associated with the logo. In the example a current running special on peaches is shown in the logo display. Such additional information may be controlled the client/user its self or by an administrator.

Figure 15:
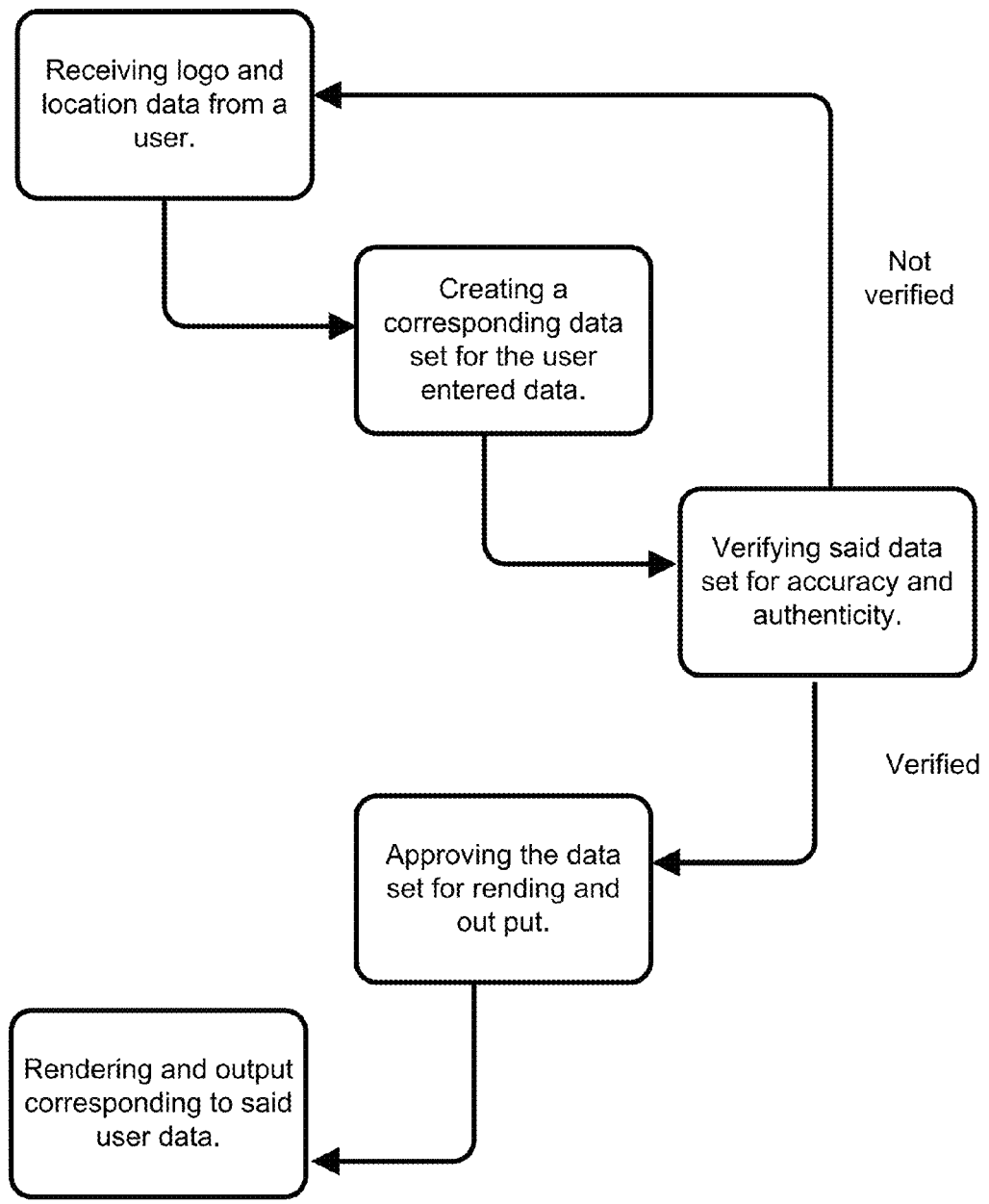
FIG. 15 illustrates a method for controlling the quality and accuracy of the rendered output from a system.

FIG. 15 illustrates a method for controlling the quality and accuracy of the rendered output from a system. The method may comprise the process of receiving logo and location data from a user/client. The method may comprise the process of creating a corresponding data set to the user-entered data. A corresponding data set may comprise additional data that corresponds to the user-entered data that is used by a system to produce the desired output. The method may comprise the process of verifying the user-entered data for accuracy. The verification process may be performed manually or automatically by comparing the user data set to a known data set. If the data is not verified a notification may be issued to the user seeking further clarification. If the data is verified the data will be approved for rendering and output.

Figure 16:
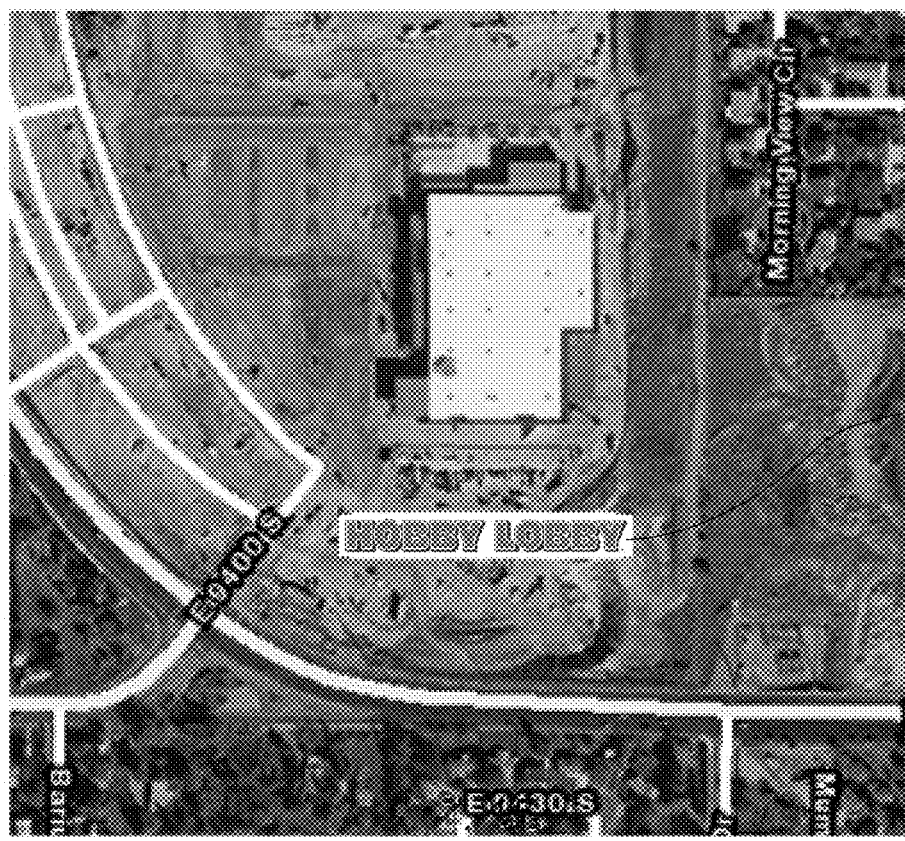
FIG. 16 illustrates an embodiment wherein an entity or building, corresponding to a logo, is under construction, planned for the future, or subject to an outdated map.

FIG. 16 illustrates an embodiment of the product of a method and system as described herein, where either the map layer is out of date, the entity has yet to be built and is planned, or the entity is under construction. As can be seen in the illustration, the logo 1510 has not been assigned an area or footprint corresponding to a real world entity.

Figure 17:
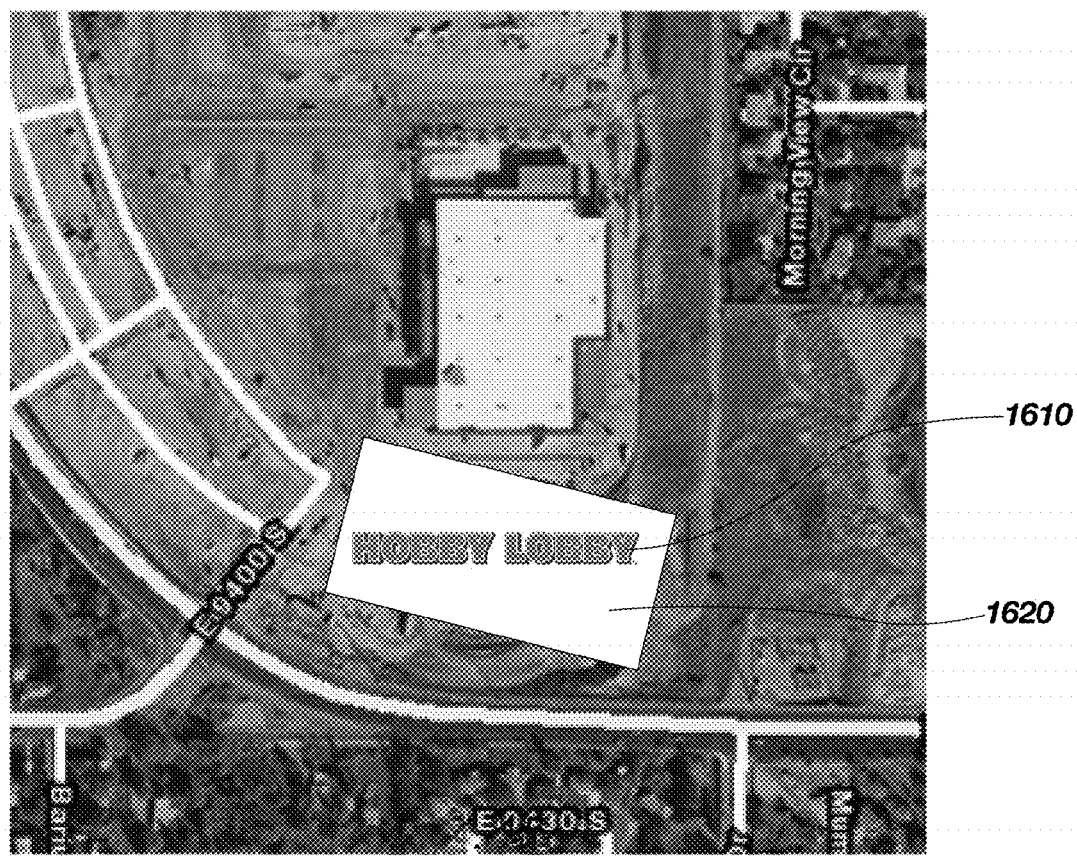
FIG. 17 illustrates an embodiment wherein an entity or building, corresponding to a logo, is yet to be constructed, planned for the future, or is subject to an out dated map.

FIG. 17 illustrates an embodiment of the product of a method and system as described herein, where either the map layer is out of date, the entity has yet to be built and is planned, or the entity is under construction. As can be seen in the illustration, the logo 1610 has been assigned an area or footprint corresponding to a real world entity or a soon to be entity. The area or footprint 1620 may be derived arbitrarily, using plat or parcel data, or building dimension data.

A user may interact with the mapping application to enable the image and logo feature disclosed herein, thereby displaying the image or logo. Logos or images may be created into a geospatial file from an image file or from a pre-existing geocoded file. The files may be geocoded, having a specific latitude and longitudinal coordinate, but may have a "0" elevation or may use the existing elevation. Thus, the logo may be located flat on the mapping plane surface.

Two-dimensional representations of logos or images may be placed within a roofline, or an extended roofline if necessary, to best accommodate the design of the logo and to fit the space available. Three-dimensional representations of logos or images may similarly be placed within a roofline, or an extended roofline if necessary, to best accommodate the design of the logo. It will be appreciated that the logos or images may not be larger than the actual property boundaries to respect the ownership of other adjoining or nearby properties. Because maps are generally read or oriented with North being located on the top of a page, logos or images may be similarly oriented or placed with a North Up reference, such that logos may be read in an anticipatory manner. Individual orientation of logos or images may be between a range of about 60 degrees to about 330 degrees. However, it will be appreciated that other orientations may be utilized that fall outside the scope of the above range without departing from the spirit or scope of the disclosure.

After a two or three-dimensional logo or image is created in an electronic image file or a geospatial file, it may become part of a logo layer database or a mapping database or a mapping provider database. Logos or images may be uploaded, whether directly from one database to another or over a network, from the logo layer database or a mapping database 16 or a mapping provider database to a geobrowser, such that a user may display information on a user device. The electronic image file may be converted to a vector file after being uploaded, which may provide the image with a specific coordinate on a mapping application. The logo layer database may be immediately accessed by a user or may be distributed to users at an interval or over a specified period of time, such as on a daily, weekly, bi-weekly, monthly, quarterly, or other basis.

It will be appreciated that the image file may be layered on top of other cartographic mapping layers that are used by cartographic mapping applications, such as MapQuest®, Google® Maps, Yahoo!® Maps, Google® Earth, Microsoft® Virtual Earth®, and others.

In accordance with the features and combinations described above, an example of a useful method for displaying images or logos on a display screen of a computing device or user device, the method comprising:

obtaining a collection of data for displaying images or logos on a cartographic mapping application;

converting the data into a vector file, wherein specific longitudinal and latitudinal coordinates are assigned to the data;

using said data to display on the display screen an image or logo.

In accordance with the features and combinations described above, an example of a useful cartographic mapping system may comprise:

a mapping database containing cartographic mapping information;

a mapping server to provide cartographic mapping information;

a mapping program or mapping application for running a set of mapping instructions or application software; and a user device connected over a network to the mapping server for displaying cartographic mapping images;

wherein data is collected in the mapping database for displaying images or logos on a cartographic mapping application when a user device is connected via a network to the mapping server, and wherein the data is converted into a vector file having specific longitudinal and latitudinal coordinates assigned to the data, such that the user device displays said data as an image or logo on the assigned coordinate.

In accordance with the features and combinations described above, a useful cartographic map may comprise:

a cartographic map;

a collection of data converted into a vector file having specific longitudinal and latitudinal coordinates assigned to the data;

wherein the vector file is layered upon the cartographic map, such that an image or logo is displayed on a user device.

Those having ordinary skill in the relevant art will appreciate the advantages provided by the features of the disclosure. For example, it is a feature of the disclosure to provide a cartographic mapping system that allows a user of a geo-browser to quickly and easily identify a business or other establishment by its name, logo, or other source-identifying object. It is a potential feature of the disclosure to provide an image file of a logo or other source-identifying object that can be uploaded, converted into a vector file with specific coordinates, and distributed to various mapping application providers to enable a user to quickly and efficiently interact with the mapping application.

It is another potential feature of the disclosure to provide a useful method for displaying images or logos on a display screen of a computing device or user device. It is another potential feature of the disclosure to provide a method including obtaining a collection of data for displaying images or logos on a cartographic mapping application; converting the data into a vector file, wherein the specific longitudinal and latitudinal coordinates are assigned to the data; and using said data to display an image or logo on the screen.

It is another potential feature of the disclosure to provide a useful cartographic mapping system that may include a mapping database containing cartographic mapping information; a mapping server to provide cartographic mapping information; a mapping program or mapping application for running a set of mapping instructions or application software; and a user device connected over a network to the mapping server for displaying cartographic mapping images; wherein data is collected in the mapping database for displaying images or logos on a cartographic mapping application when a user device is connected via a network to the mapping server, and wherein the data is converted into a vector file having specific longitudinal and latitudinal coordinates assigned to the data, such that the user device displays said data as an image or logo on the assigned coordinates. It is another potential feature of the disclosure to provide a useful cartographic map that may comprise a cartographic map; a collection of data converted into a vector file having specific longitudinal and latitudinal coordinates assigned to the data; wherein the vector file is layered upon the cartographic map such that an image or logo is displayed on a user device.

The system as described above, and below in the claims, may be implemented through a webpage interface wherein a user or client would input logo and location information into the interface. The interface may comprise all or some of the elements and features of the system as described below in the claims. There may be an approval process either automated or manual for controlling the quality of the end product.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure. Thus, while the disclosure has been shown in the drawings and described above with particularity and detail, it will be apparent to those of ordinary skill in the art that numerous modifications, including, but not limited to, variations in size, materials, shape, form, function and manner of operation, assembly, and use may be made without departing from the principles and concepts set forth herein.

What is claimed is:

1. A computer system for providing a logo layer overlay on a map comprising:

a logo computer database having logo data representing logo images;

a map computer database having map data representing a geographical area;

an entity location computer database having entity location data representing entity locations;

an entity footprint computer database having entity footprint data representing an area that an entity occupies from a top down perspective;

a bounding component that identifies the dimensions of the logo image and identifies the dimensions of the entity footprint and sizes the logo image so as to fit within the dimensions of the entity footprint and storing the dimensions of the logo image, the dimensions of the entity footprint and the sized logo image in computer memory;

a location component that identifies an entity location corresponding to map data within said map computer database;

a scaling component to determine a size of the logo corresponding to the identified dimensions of the entity footprint as determined by the bounding component, and wherein the scaling component comprises a prescribed limit that limits how small the logo will get in response to a zoom operation;

wherein the scaling component further determines a priority for displaying the logo in response to a zoom operation;

a rendering component that renders an output to a user wherein said output comprises:

a map layer corresponding to an entity location;

a logo layer corresponding to an entity footprint;

wherein said entity footprint is rendered approximate said entity location;

wherein said logo layer is rendered corresponding to said entity footprint;
wherein said logo layer is the top most layer rendered; and
said logo layer is bounded by the dimensions of said footprint.

2. The system of claim 1, wherein the scaling component identifies the scale of the map data and applies a scaling factor to scale the dimensions of the entity footprint and also scales the logo so as to fit within the scaled dimensions of the entity footprint.

3. The system of claim 1, further comprising an information component that identifies additional information data corresponding to the logo and causes additional information to be rendered.

4. The information component of claim 3, wherein said additional information is advertising data.

5. The system of claim 1, further comprising an information component that identifies additional information to be rendered corresponding to the logo and location.

6. The system of claim 1, wherein the map computer database is provided by a third party.

7. The system of claim 1, the bounding component further comprising: a parcel polygon set of instructions that ascertains a polygon that defines a viewable surface of the entity.

8. The system of claim 1, the bounding component further comprising: an edge detection set of instructions that determines an outside perimeter of an entity footprint selected from said entity footprint computer database.

9. The system of claim 1, further comprising an entity information computer database having detailed entity information about a business of an occupant of a corresponding entity and wherein detailed information is rendered in a layer to be output.

10. The system of claim 9, wherein the information data includes one or more advertisements related to the business of the corresponding entity and wherein the advertisements are rendered in a layer to be output.

11. The system of claim 9, further comprising a user interface wherein detailed information can be changed by a user or administrator in real time.

12. The system of claim 1, wherein the rendering component selectively alters the orientation of the logo corresponding to the orientation of the rendered map layer so as to make said logo readable to a user.

13. The system of claim 1, further comprising an entity entrance computer database having entity entrance data representing the location of the entrances for an entity and wherein the entrances of the entity to be rendered in a layer to be output.

14. The system of claim 1, further comprising a multi-tenant entity computer database having detailed tenant entity information for a plurality of tenants in a single entity.

15. The system of claim 14, wherein the relative location of tenants within a multi-tenant entity is rendered in a layer to be output.

16. The system of claim 1, further comprising a logo priority component comprising instructions for determining a rendering hierarchy when rendering area is limited.

17. The system of claim 1, further comprising a bounding override component comprising instructions for determining the displayed dimensions of a logo when said entity footprint dimensions is scaled too small for supporting a readable logo rendering.

18. The system of claim 1, further comprising a plat computer database having plat data and wherein a plat correlation component comprises instructions to determine the displayed dimensions of a logo to be rendered based on plat data.

19. The system of claim 1, further comprising a security component comprising instructions for preventing unauthorized use of the system.

20. The system of claim 1, further comprising an Internet based user interface for entering data into the system.

21. The system of claim 1, further comprising an account computer database having account data therein.

22. The system of claim 1, further comprising an approval component comprising instructions for preventing data entered by a user from being used in the system until it is approved, and wherein said approval component allows data entered by a user to be used after said data has been approved.

23. The system of claim 22, wherein said approval is based on verification of location data.

24. The system of claim 1, further comprising a user interface configured to receive input from a user.

25. A method of overlaying a logo layer in a map using a computer comprising:
    collecting a logo computer database having logo data representing logo images stored in computer memory;
    collecting a map computer database having map data representing a geographical area stored in computer memory;
    collecting an entity location computer database having entity location data representing entity locations stored in computer memory;
    collecting an entity footprint computer database having entity footprint data representing an area an entity occupies from a top down perspective;
    identifying the dimensions of the logo image;
    identifying the dimensions of the entity footprint;
    sizing the logo image so as to fit within the dimensions of the entity footprint and storing said image logo in computer memory;
    identifying an entity location corresponding to map data within said map computer database;
    determining a size of the logo corresponding to the identified dimensions of the entity footprint as determined by the bounding component using a scaling component that prescribes a limit limiting how small the logo image will get in response to a zoom operation;
    determining a priority for displaying the logo image in response to a zoom operation using the scaling component;
    rendering an output to a user wherein said output comprises:
        a map layer corresponding to an entity location;
        a logo layer corresponding to an entity footprint;
    rendering said entity footprint approximate to said entity location;
    rendering said logo layer so as to correspond to said entity footprint;
    overlaying said logo layer as the top most layer on to said map layer; and
    bounding logos within said logo layer according to dimensions of said footprint.

26. The method of claim 25, further comprising identifying the scale of the map data and applying a scaling factor to scale the dimensions of the entity footprint; and scaling the logo so as to fit within the scaled dimensions of entity footprint.

27. The method of claim 25, further comprising identifying additional information data corresponding to the logo; and rendering said additional information.

28. The method of claim 27, wherein said additional information is advertising data.

29. The method of claim 25, further comprising identifying additional information to be rendered corresponding to the logo and location.

30. The method of claim 25, further comprising receiving map computer database from a third party source.

31. The method of claim 25, further comprising supplying said rendered logo layer to a third party for inclusion with the third party's rendered layers.

32. The method of claim 25, further comprising ascertaining a polygon as a boundary defining an entity footprint.

33. The method of claim 25, further comprising detecting the edge of an entity footprint and generating a footprint data set.

34. The method of claim 33, further comprising updating said detailed information in real time.

35. The method of claim 25, further comprising rending entity information about a business of an occupant of a corresponding entity in a layer to be output.

36. The method of claim 35, wherein the information data includes one or more advertisements related to the business of the corresponding entity.

37. The method of claim 25, further comprising selectively altering the orientation of the logo to correspond to the orientation of the rendered map layer so as to make said logo readable to a user.

38. The method of claim 25, further comprising rendering the location of entity entrances in a layer.

39. The method of claim 25, further comprising placing a logo on a multi-tenant entity footprint corresponding to the relative location of tenants within a multi-tenant entity.

40. The method of claim 25, further comprising determining a rendering hierarchy when rendering area is limited.

41. The method of claim 25, further comprising not scaling the dimensions of a logo when said entity footprint dimensions is scaled too small for supporting a readable logo rendering.

42. The method of claim 25, further comprising using plat data to determine the displayed dimensions of a logo to be rendered.

43. The method of claim 25, further comprising preventing unauthorized access by providing security means.

44. The method of claim 25, further implemented through a webpage interface to a user.

45. An Internet based webpage for providing a logo layer overlay on a map using a computer comprising:

a user interface configured to receive a user input comprising a logo and location information;

a user logo and location computer database representing the logo and location data input by said user and stored in computer memory;

a map computer database having map data representing a geographical area stored in computer memory;

an entity location computer database having entity location data representing entity locations stored in computer memory;

an entity footprint computer database having entity footprint data representing an area that an entity occupies from a top down perspective;

a bounding component that identifies the dimensions of the logo image and identifies the dimensions of the entity footprint and sizes the logo image so as to fit within the dimensions of the entity footprint and storing the dimensions of the logo image, the dimensions of the entity footprint and the sized logo image in computer memory;

a location component that identifies an entity location corresponding to map data within said map computer database;

a scaling component to determine a size of the logo corresponding to the identified dimensions of the entity footprint as determined by the bounding component, and wherein the scaling component comprises a prescribed limit that limits how small the logo will get in response to a zoom operation;

wherein the scaling component further determines a priority for displaying the logo in response to a zoom operation;

a rendering component that renders an output to a user wherein said output comprises:
 a map layer corresponding to an entity location;
 a logo layer corresponding to an entity footprint;
wherein said entity footprint is rendered approximate said entity location;
wherein said logo layer is rendered corresponding to said entity footprint;
wherein said logo layer is the top most layer rendered; and
said logo layer is bounded by the dimensions of said footprint.

46. The webpage of claim 45 further comprising an approval component for approving the logo and location inputs by said user.

* * * * *